US010665980B2

(12) United States Patent
Saitoh et al.

(10) Patent No.: US 10,665,980 B2
(45) Date of Patent: May 26, 2020

(54) DIVIDED CONNECTOR COVER WITH ENGAGING LOCKING PORTIONS FOR PREVENTING DAMAGE AND COVER SEPARATION DUE TO EXCESSIVE TENSILE FORCE

(71) Applicant: YAZAKI CORPORATION, Tokyo (JP)

(72) Inventors: Masayuki Saitoh, Shizuoka (JP); Miyako Okuyama, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 16/059,027

(22) Filed: Aug. 8, 2018

(65) Prior Publication Data

US 2019/0081430 A1    Mar. 14, 2019

(30) Foreign Application Priority Data

Sep. 11, 2017   (JP) .................. 2017-174163

(51) Int. Cl.
| | |
|---|---|
| *H01R 13/502* | (2006.01) |
| *H01R 13/639* | (2006.01) |
| *H02G 3/04* | (2006.01) |
| *H01R 13/516* | (2006.01) |
| *H01R 13/58* | (2006.01) |
| *H02G 3/06* | (2006.01) |
| *H01R 13/506* | (2006.01) |

(52) U.S. Cl.
CPC ......... *H01R 13/502* (2013.01); *H01R 13/516* (2013.01); *H01R 13/5812* (2013.01); *H01R 13/5825* (2013.01); *H01R 13/639* (2013.01); *H02G 3/0462* (2013.01); *H02G 3/0691* (2013.01); *H01R 13/506* (2013.01); *H02G 3/0468* (2013.01)

(58) Field of Classification Search
CPC .. H01R 13/516; H01R 13/639; H01R 13/502; H01R 13/5835; H01R 9/24; H01R 9/2408; H01R 9/2491
USPC .......................................... 439/625
See application file for complete search history.

(56) References Cited

U.S. PATENT DOCUMENTS 4,108,527 A * 8/1978 Douty ............... H01R 13/5825
                                              439/465
4,421,376 A * 12/1983 Cosmos ............. H01R 13/516
                                              439/350

(Continued)

FOREIGN PATENT DOCUMENTS

| JP | 2006-138445 A | 6/2006 |
| JP | 2007-220691 A | 8/2007 |

(Continued)

*Primary Examiner* — Tulsidas C Patel
*Assistant Examiner* — Peter G Leigh
(74) *Attorney, Agent, or Firm* — Kenealy Vaidya LLP

(57) ABSTRACT

A lower cover of the connector cover includes a pair of elastic hold arms projected upward from both side walls of a tube placement wall. An upper cover includes a pair of arm storing portions for storing the pair of elastic hold arms. The pair of arm storing portions respectively have facing surfaces. The facing surfaces respectively face side surfaces of the pair of hold arms perpendicular to the wire lead-out direction, when the lower cover and the upper cover are connected to each other.

7 Claims, 20 Drawing Sheets

(56) References Cited

U.S. PATENT DOCUMENTS

| | | | | | |
|---|---|---|---|---|---|
| 4,606,596 | A | * | 8/1986 | Whiting | H01R 13/58 439/465 |
| 4,749,369 | A | * | 6/1988 | Wang | H01R 13/516 439/459 |
| 4,762,505 | A | * | 8/1988 | Asick | H01R 13/6275 439/347 |
| 4,798,542 | A | * | 1/1989 | Asick | H01R 13/7032 439/188 |
| 4,842,549 | A | * | 6/1989 | Asick | H01R 13/5837 439/455 |
| 4,961,711 | A | * | 10/1990 | Fujiura | H01R 13/6275 439/357 |
| 5,295,859 | A | * | 3/1994 | Kawai | H01R 13/506 439/447 |
| 5,315,062 | A | * | 5/1994 | Hoshino | H01R 13/506 174/72 C |
| 5,372,513 | A | * | 12/1994 | Rodrigues | H01R 13/6589 439/98 |
| 5,417,590 | A | * | 5/1995 | Dechelette | H01R 13/64 439/607.48 |
| 5,586,916 | A | * | 12/1996 | Shinji | H01R 13/501 439/448 |
| 5,688,144 | A | * | 11/1997 | Kosuge | H01R 13/516 439/466 |
| 5,839,911 | A | * | 11/1998 | Dinkel | H01R 13/582 439/470 |
| 5,888,097 | A | * | 3/1999 | DiCicco | H01R 9/032 439/589 |
| 5,908,327 | A | * | 6/1999 | Tsuji | H01R 13/506 439/470 |
| 6,095,852 | A | * | 8/2000 | Gregory, II | H01R 13/506 439/466 |
| 6,568,967 | B2 | * | 5/2003 | Inaba | H01R 13/501 439/701 |
| 6,814,581 | B2 | * | 11/2004 | Matsuo | H01R 13/5202 439/35 |
| 6,926,535 | B2 | * | 8/2005 | Tsuji | H01R 13/501 439/31 |
| 6,962,503 | B2 | * | 11/2005 | Aekins | H01R 13/6463 439/418 |
| 6,962,504 | B2 | * | 11/2005 | Fukui | H01R 13/562 439/466 |
| 6,971,905 | B2 | * | 12/2005 | Makita | H01R 13/5205 439/447 |
| 7,021,959 | B2 | * | 4/2006 | Tsuji | H01R 13/562 439/470 |
| 7,070,457 | B2 | * | 7/2006 | Kluempke | H01R 13/514 439/687 |
| 7,132,600 | B2 | * | 11/2006 | Kaneko | H01R 13/506 174/480 |
| 7,422,470 | B2 | * | 9/2008 | Tsuji | H01R 13/506 439/470 |
| 7,524,215 | B2 | * | 4/2009 | Banas | H01R 13/506 439/465 |
| 8,192,229 | B2 | * | 6/2012 | Endo | H01R 13/501 439/596 |
| 8,491,328 | B2 | * | 7/2013 | Mulfinger | H01R 13/516 439/447 |
| 9,088,099 | B2 | * | 7/2015 | Urashima | H01R 13/506 |
| 9,287,652 | B2 | * | 3/2016 | Torii | H01R 13/506 |
| 9,461,400 | B2 | * | 10/2016 | Kanda | H01R 13/5829 |
| 9,537,249 | B2 | * | 1/2017 | Grudzewski | H01R 13/502 |
| 2004/0187258 | A1 | * | 9/2004 | Tsuji | H01R 13/501 16/225 |
| 2005/0003698 | A1 | * | 1/2005 | Hata | H02G 3/0691 439/470 |
| 2008/0188120 | A1 | * | 8/2008 | Tsuji | H01R 13/5841 439/470 |
| 2008/0280467 | A1 | * | 11/2008 | Tsuji | H01R 13/4223 439/135 |
| 2009/0084578 | A1 | | 4/2009 | Irisawa | |
| 2010/0240252 | A1 | * | 9/2010 | Cappe | H01R 13/5205 439/587 |

FOREIGN PATENT DOCUMENTS

| | | |
|---|---|---|
| JP | 2017-10754 A | 1/2017 |
| WO | 2007/132544 A1 | 11/2007 |

* cited by examiner

FIG.5A
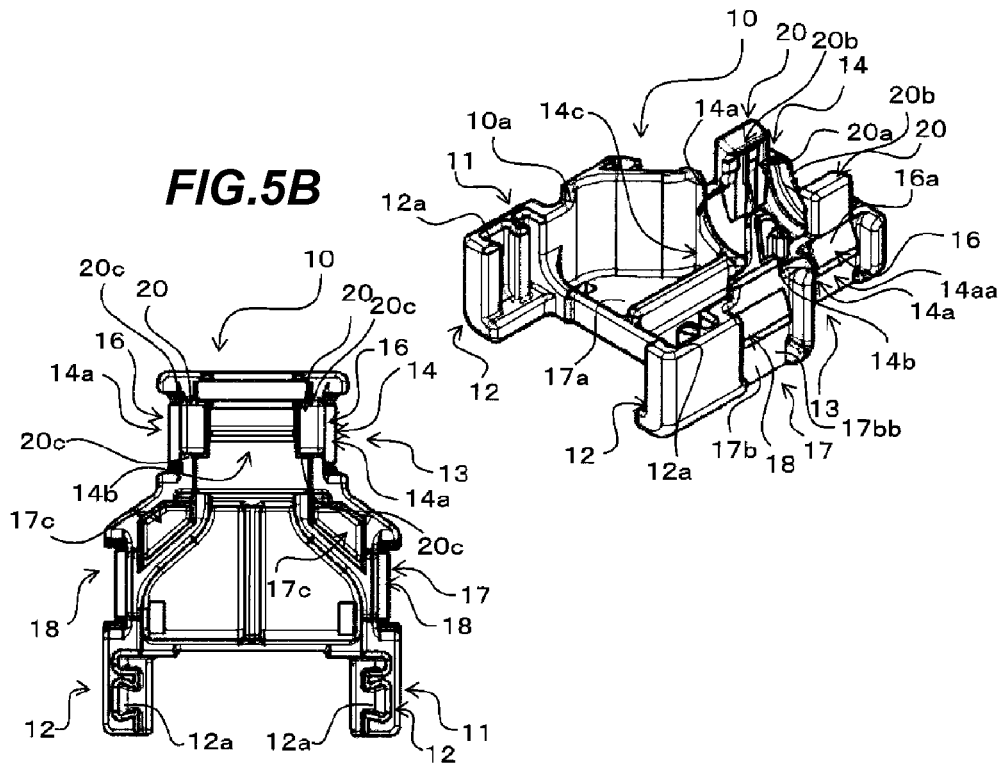
FIG.5B
FIG.5C
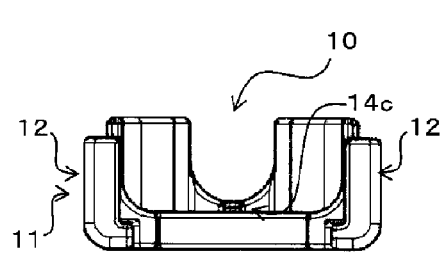
FIG.5D
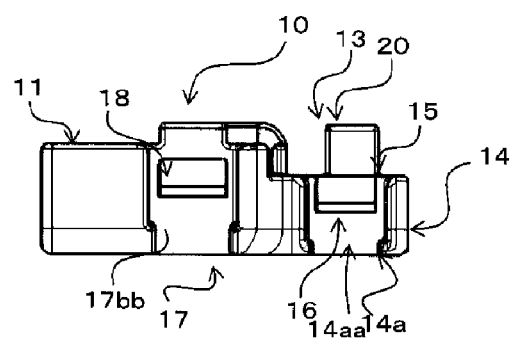

DIVIDED CONNECTOR COVER WITH ENGAGING LOCKING PORTIONS FOR PREVENTING DAMAGE AND COVER SEPARATION DUE TO EXCESSIVE TENSILE FORCE

CROSS-REFERENCES TO RELATED APPLICATIONS

This application is based on and claims priority from Japanese Patent Applications No. 2017-174163 filed on Sep. 11, 2017, the entire contents of which are incorporated herein by reference.

BACKGROUND

1. Field of the Invention

The invention relates to a connector cover which is divided vertically and is assembled so as to sandwich a wire lead-out side end of a connector housing and an end of a corrugated tube.

2. Description of Related Art

Conventionally, for example, a connector cover for use with a connector of a wire harness arranged in a vehicle and the like is divided vertically and is assembled so as to sandwich a wire lead-out side end of a connector housing and an end of a corrugated tube.

For example, Patent Documents 1 and 2 disclose a connector cover whose upper and lower covers are connected to each other.

In a connector cover disclosed in Patent Document 1, there is a fear that, when transporting the connector cover, or when arranging a wire harness to a vehicle, as shown in FIG. 18, if a tensile force is applied to a corrugated tube C with a portion (a portion surrounded by a circle in FIG. 18) of a connector cover A caught by something, a load is applied to locking parts B of the vertically divided cover and they are damaged easily.

In a connector cover disclosed in the Patent Document 2, a corrugated tube is held stably by a provisionally holding projection of the lower cover for provisionally holding the corrugated tube. Therefore, when a tensile force is applied to the corrugated tube, similarly to the connector cover of the patent document 1, a load is easily applied to locking portions of the vertically divided cover and they are damaged easily.

Patent Document 1: JP-A-2017-010754
Patent Document 2: JP-A-2007-220691

SUMMARY

Embodiments relates to a vertically divided connector cover which, even when a tensile force is applied to a corrugated tube, can prevent locking portions of the vertically divided connector cover against damage.

In accordance with embodiments, a connector cover includes a lower cover and an upper cover. The lower cover and the upper cover are to be connected to each other so as to sandwich an end of a connector housing from which a wire is led out and an end of a corrugated tube that stores the wire led out from the connector housing between the lower cover and the upper cover.

The lower cover includes a tube placement wall which has an arc-shaped inner surface and on which the corrugated tube is placed, and a pair of elastic hold arms projected upward from both side walls of the tube placement wall and configured to elastically hold both side portions of the corrugated tube.

The upper cover includes a pair of arm storing portions respectively configured to store the pair of elastic hold arms therein.

The pair of arm storing portions respectively have facing surfaces. The facing surfaces respectively face side surfaces of the pair of hold arms perpendicular to the wire lead-out direction, in a state where a locking part of the lower cover and a locking part of the upper cover are locked to each other and the lower cover and the upper cover are connected to each other.

Other aspects and advantages of the invention will be apparent from the following description and the appended claims.

BRIEF DESCRIPTION OF THE DRAWINGS

FIGS. 5A to 5D shows multiple views of the lower cover when viewed from different directions. FIG. 5A is a perspective view. FIG. 5B is a top view. FIG. 5C is a view when viewed from the side thereof to be connected to the connector housing. FIG. 5D is a side view.

FIG. 6A is a perspective view. FIG. 6B is a view when viewed from the lower side. FIG. 6C is a view when viewed from the side thereof to be connected to the connector housing. FIG. 6D is a side view.

DETAILED DESCRIPTION

Description is given below specifically of exemplary embodiments of a connector cover according to the invention with reference to the drawings.

[Embodiment 1]

Figure 1:
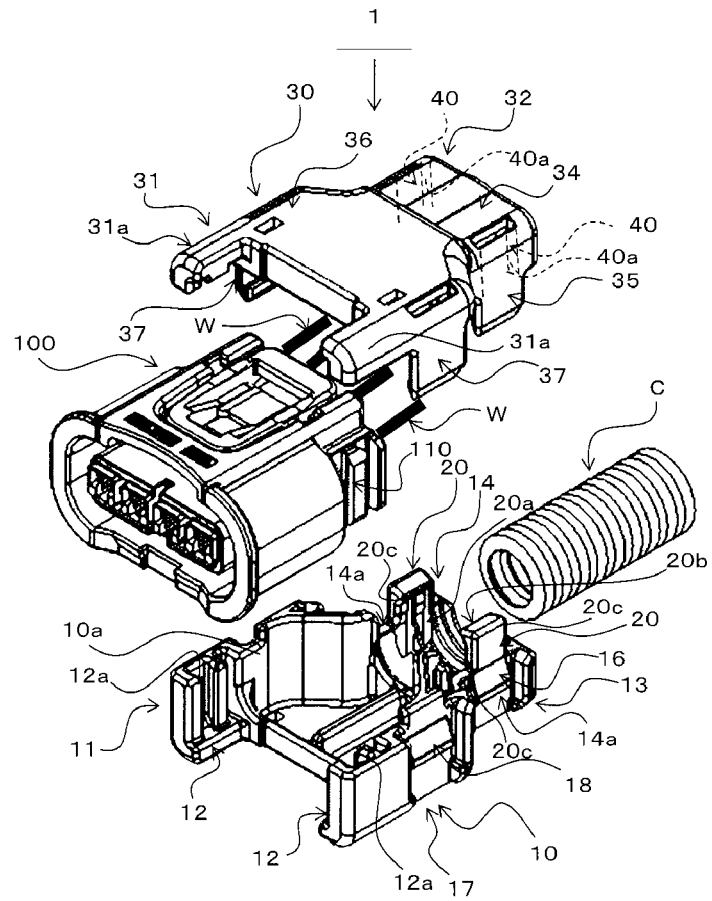
FIG. 1 shows a state of a connector cover according to an embodiment 1 before an upper cover and a lower cover thereof are assembled together so as to sandwich an end of a connector housing and an end of a corrugated tube.
Figure 2:
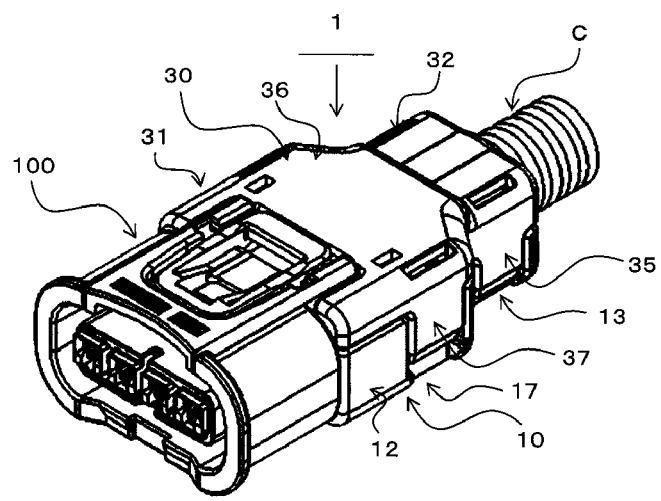
FIG. 2 shows a state of the connector cover according to the embodiment 1 in which the upper and lower covers are assembled together so as to sandwich the end of the connector housing and the end of the corrugated tube.
Figure 3:
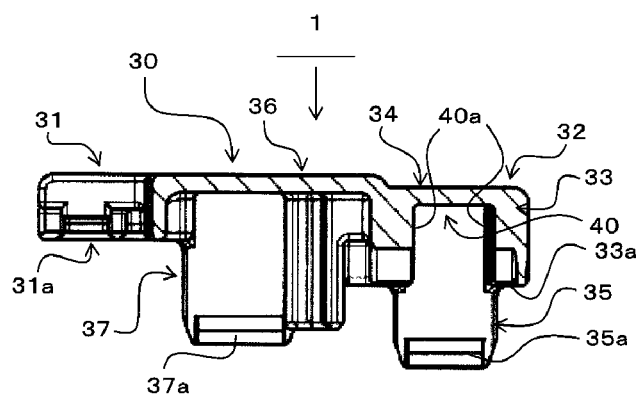
FIG. 3 is a section view of the upper and lower covers in a state where they face each other in their mutually locking direction.
Figure 3:
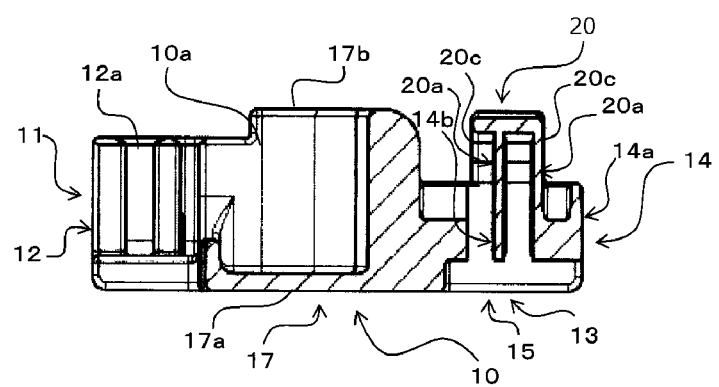
Figure 4:
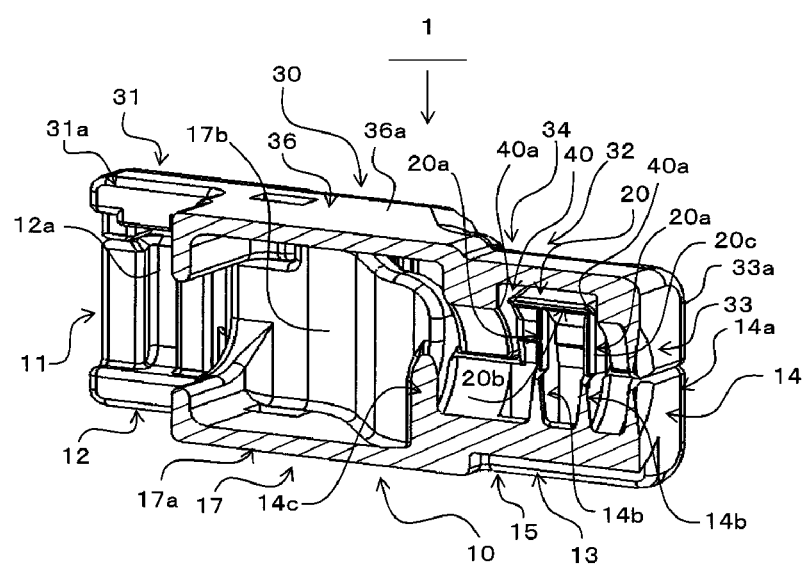
FIG. 4 is a section view of the upper and lower covers in a state where they are locked to each other.
Figure 6A:
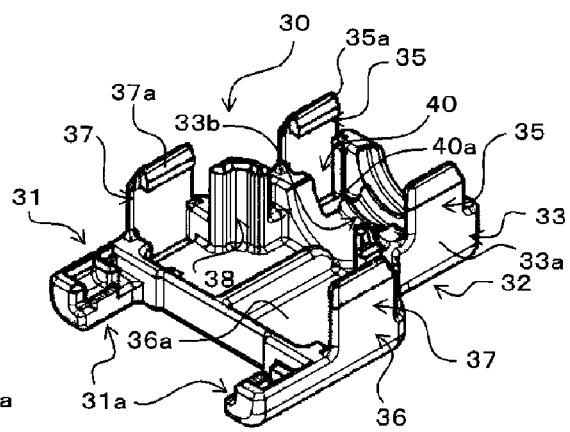
FIGS. 6A to 6D shows multiple views of the upper cover when viewed from different directions.
Figure 6B:
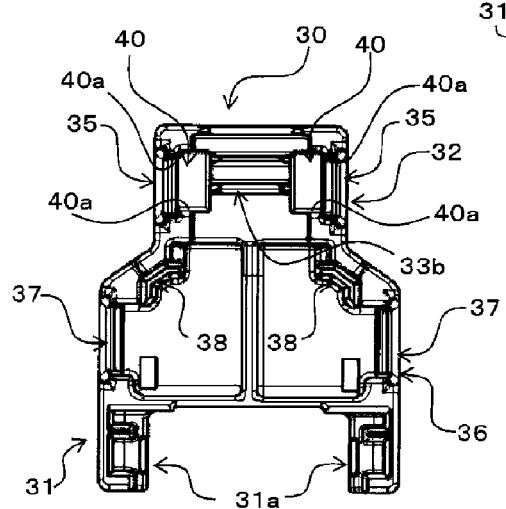
Figure 6C:
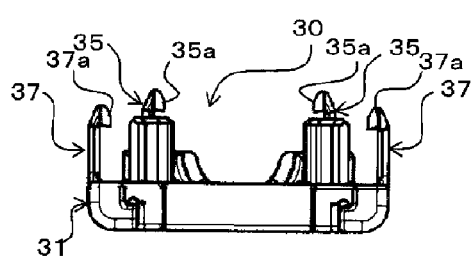
Figure 6D:
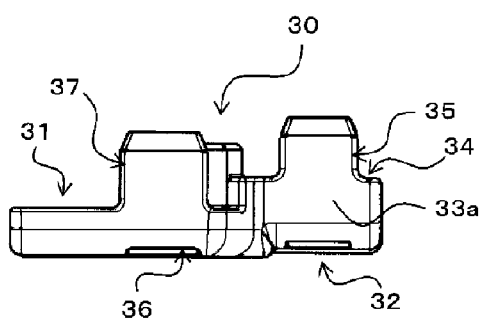

FIG. 1 is a view showing a state of a connector cover 1 according to an embodiment 1 before an upper cover 30 and a lower cover 10 thereof are assembled together so as to sandwich an end of a connector housing 100 and an end of a corrugated tube C. FIG. 2 shows a state of the connector cover 1 according to the embodiment 1 in which the upper cover 30 and lower cover 10 are assembled together so as to sandwich the end of the connector housing 100 and the end of the corrugated tube C. FIG. 3 is a section view of the upper side cover 30 and lower cover 10 in a state where they face each other in their mutually locking direction. FIG. 4 is a section view of the connector cover 1 in a state where upper cover 30 and lower cover 10 are locked to each other. FIGS. 5A to 5D are multiple views of the lower cover 10 when viewed from different directions: Specifically, FIG. 5A is a perspective view; FIG. 5B is a top view; FIG. 5C is a view when viewed from the side thereof to be connected to the connector housing 100; and, FIG. 5D is a side view. FIGS. 6A to 6D are multiple views of the upper cover 30 when viewed from different directions: Specifically, FIG. 6A is a perspective view; FIG. 6B is a view when viewed from the lower side; FIG. 5C is a view when viewed from the side thereof to be connected to the connector housing 100; and, FIG. 5D is a side view.

The connector cover 1 according to the embodiment 1 includes the lower cover 10 and the upper cover 30 vertically divided and assembled together so as to sandwich an end of the connector housing 100 on a side where a wire W is led out and an end of a corrugated tube C for protecting and storing the wire W led out from the connector housing 100.

Firstly, description is given of the lower cover 10.

The lower cover 10 is made of an insulating material and has a substantially box-like shape with its upper surface opened so that the end of the connector housing 100 and the end of the corrugated tube C can be stored in the interior thereof.

The lower cover 10 includes a connector connecting part 11 to be connected to the wire W lead-out side end of the connector housing 100, a tube connecting part 13 to be connected to the corrugated tube C, and an intermediate part 17 for connecting together the connector connecting part 11 and tube connecting part 13.

The intermediate part 17 includes a bottom wall 17a and a pair of side walls 17b, 17b respectively erected along both end edges of the bottom wall 17a. The connector connecting part 11 is connected to one end side of the intermediate part 17 in the wire W lead-out direction, while the tube connecting part 13 is connected to the other end side.

The intermediate part 17 includes walls erected on the bottom wall 17a which are formed by combining parts of the side walls 17b and closing them to provide spaces; and, such erected walls are used as a pair of rib storage portions 17c, 17c for storing a pair of backlash suppressing ribs 38, 38 (which are described later) of the upper cover 30.

The walls forming the pair of rib storage portions 17c, 17c are arranged so as to guide the wire W led out from the end of the connector housing 100 toward the tube connecting part 13.

Also, in the intermediate part 17, the paired side walls 17*b*, 17*b* include recesses 17*bb* formed in their respective outer surfaces and extending from the upper end toward the lower end in a direction where the intermediate part 17 is assembled to the upper cover 30 and, on the recesses 17*bb*, there are provided locking projections 18 for locking the upper cover 30.

The connector connecting part 11 includes a pair of locking piece portions 12, 12 projected in a piece-like shape from the ends of the side walls 17*b* so as to extend from the paired side walls 17*b*, 17*b* of the intermediate part 17.

The pair of locking piece portions 12, 12 respectively include in their mutually facing surfaces locking grooves 12*a* into which locking projections 110 formed in the end of the connector housing 100 can be fitted.

The tube connecting part 13 includes a tube storage main body 15 including a tube placement wall 14 capable of placing the corrugated tube C thereon and having an arc-shaped inner surface. In addition, the tube connecting part 13 includes a pair of elastic hold arms 20, 20 for elastically holding both side portions of the corrugated tube C placed on the tube placement wall 14. Moreover, the tube connecting part 13 includes a pair of locking projections 16, 16 serving as a locking part for locking the upper cover 30.

The tube storage main body 15 includes a positioning wall 14*c* for pushing the end of the corrugated tube C against the boundary position between the intermediate part 17 and tube placement wall 14 to position the corrugated tube C.

On the arc-shaped inner surface of the tube placement wall 14, there are formed multiple corrugated tube engaging ridges 14*b* such that they can be fitted into bellows-shaped recesses formed in the corrugated tube C.

The paired of elastic hold arms 20, 20 are projected upward from the upper end faces of the two side walls 14*a*, 14*a* of the tube placement wall 14 so as to elastically hold both side portions of the corrugated tube C.

The pair of elastic hold arms 20, 20 include in their respective inner surfaces multiple arm side corrugated tube engaging ridges 20*a* formed to be continuous with the multiple corrugated tube engaging ridges 14*b* of the inner surface of the tube placement wall 14, while the ridges 20*a* are capable of being fitted into bellows-shaped recesses of the corrugated tube C.

The arm side corrugated tube engaging ridges 20*a* are formed to be able to have a function to enhance the rigidity of the paired elastic hold arms 20, or, a function to serve as a side surface 20*c* to be pushed against an arm storage part 40 (which is described later).

The pair of elastic hold arms 20, 20 include, on their respective upper ends, tube fixing projections 20*b* which are projected inward.

In the pair of elastic hold arms 20, 20, the distance between the vertexes of the respective tube fixing projections 20*b* is set smaller than the outermost diameter of the corrugated tube C.

The pair of locking projections 16, 16 respectively protrude from the bottom surfaces of recesses 14*aa* formed in outer surfaces of both side walls 14*a*, 14*a* of the tube placement wall 14 and extending from the upper ends thereof toward the lower ends thereof in a direction of attachment to the upper cover 30.

The respective locking projections 16 are provided side by side with the elastic hold arms 20 at the base position of the elastic hold arms 20 along the assembling direction with the upper cover 30.

The bottom surfaces of the recesses 14*aa* on which the locking projections 16 and the outer surfaces of the elastic hold arms 20 respectively form flush surfaces which extend linearly in the vertical direction.

Next, description is given of the upper cover 30.

The upper cover 30 is made of an insulating material and has a substantially plate-like shape so as to close an opening 10*a* of the lower cover 10.

The upper cover 30 includes a connector connecting part 31 to be connected to such end of the connector housing C as exists on the wire W lead-out side. In addition, the upper cover 30 includes a tube connecting part 32 to be connected to the corrugated tube C. Moreover, the upper cover 30 includes an intermediate part 36 connecting together the connector connecting part 31 and tube connecting part 32.

The intermediate part 36 includes a ceiling wall 36*a*, a pair of locking arms 37, 37 erected on both end edges of the ceiling wall 36*a*, and a pair of backlash suppressing ribs 38, 38.

The respective ends of the pair of locking arms 37, 37 are locked, as the locking part of the connector cover, to the pair of locking projections 18, 18 formed in the intermediate part 17 of the lower cover 10.

The pair of locking arms 37, 37 respectively have locking projections 37*a* in the ends thereof.

The pair of backlash suppressing ribs 38, 38 protrude from the inner surface of the ceiling wall 36*a*. In a state where the upper cover 30 and lower cover 10 are connected and fixed together, the pair of backlash suppressing ribs 38, 38 are stored into the pair of rib storage portions 17*c*, 17*c* of the lower cover 10, thereby functioning to suppress backlash in the state where the upper cover 30 and lower cover 10 are connected together.

The connector connecting part 31 includes a pair of piece portions 31*a*, 31*a* respectively protruding in a piece-like manner from both sides of the ceiling wall 36*a* of the intermediate part 36.

The pair of piece portions 31*a*, 31*a* are portions which are fitted over the end of the connector housing 100 in such a manner that they are superimposed on upper end edge surfaces of the pair of locking piece portions 12, 12 of the lower cover 10.

The tube connecting part 32 includes a main body portion 34 including a tube covering wall 33 which has an arc-shaped inner surface and covers such portion of the corrugated tube C placed on the tube placement wall 14 as is exposed from the opening 10*a* of the lower cover 10 in a manner to continue with the arc-shaped inner surface of the tube placement wall 14 of the lower cover 10. The tube connecting part 32 also includes a pair of locking arm portions 35, 35 (serving as the locking part of the connector cover) to be locked to the pair of locking projections 16, 16 of the lower cover 10. In addition, the tube connecting part 32 includes a pair of arm storing portions 40, 40 for storing the pair of elastic hold arms 20, 20.

On the arc-shaped inner surface of the tube covering wall 33, there are provided multiple corrugated tube engaging ridges 33*b* so as to be fitted into the bellows-shaped recesses of the corrugated tube C.

The pair of locking arm portions 35, 35 protrude from lower end faces of both side walls 33*a*, 33*a* of the tube covering wall 33. The pair of locking arm portions 35, 35 include in their respective ends a pair of locking projections 35*a* capable of being locked to the pair of locking projections 16, 16 formed on the tube connecting part 13 of the lower cover 10.

The pair of arm storing portions 40, 40 include facing surfaces 40*a* which face side surfaces 20*c* of the pair of elastic hold arms 20, 20 perpendicular to the wire W lead-out direction of the elastic hold arms 20, 20, when the upper cover 30 and lower cover 10 are connected and fixed together with their respective locking portions 16, 18 locked to each other. The arm storing portions 40 are enabled to store the elastic hold arms 20, 20 therein.

More specifically, the arm storing portions 40 are recessed portions which are formed in the inner surfaces of the side walls 33a of the tube covering wall 33 in such a manner that they have a width slightly larger than the width of the elastic hold arms 20 in the wire lead-out direction.

Next, a procedure for setting the corrugated tube C on the lower cover 10 and the operations of the respective parts of the lower cover 10 are described with reference to FIGS. 7A to 7G.

Figure 7A:
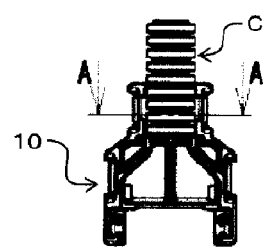
FIG. 7A is a top view of the lower cover.
Figure 7B:
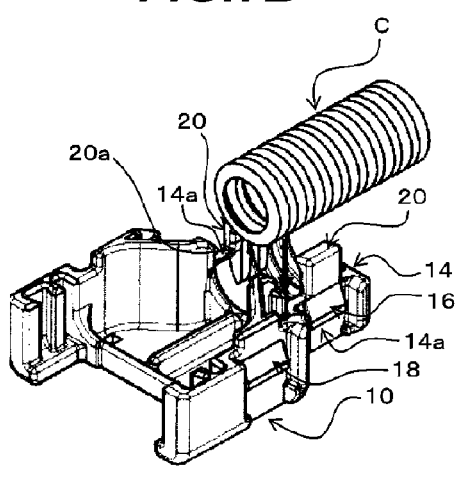
FIG. 7B is a perspective view showing a state before a corrugated tube is set on the lower cover.
Figure 7C:
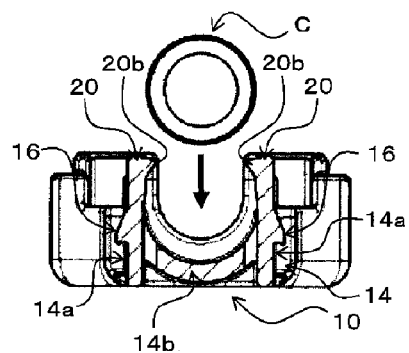
FIG. 7C is a view of the state of FIG. 7B shown at a section position along the A-A line shown in FIG. 7A.
Figure 7D:
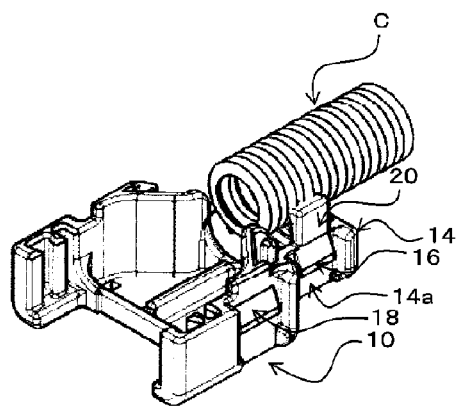
FIG. 7D is a perspective view showing a state where a corrugated tube is inserted between a pair of elastic hold arms of the lower cover.
Figure 7E:
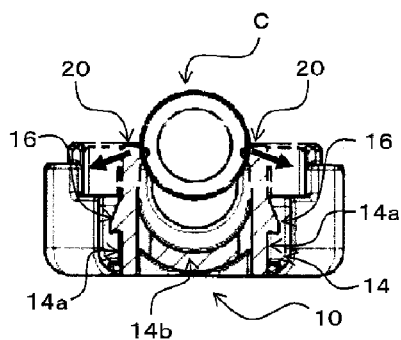
FIG. 7E is a view of the state of FIG. 7D shown at a section position along the A-A line shown in FIG. 7A.
Figure 7F:
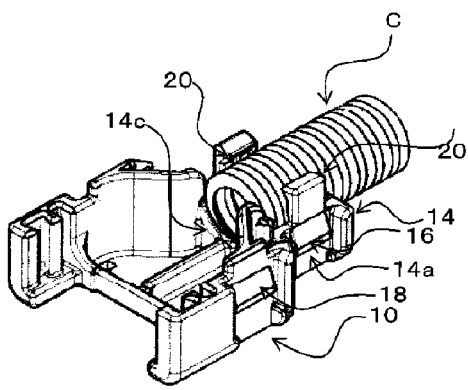
FIG. 7F is a perspective view showing a state where setting of the corrugated tube on the lower cover is completed.
Figure 7G:
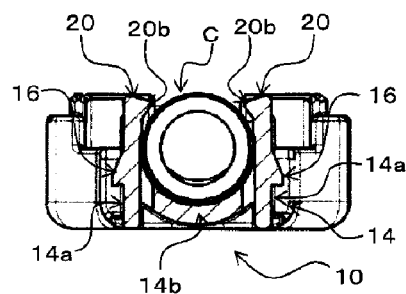
FIG. 7G is a view of the state of FIG. 7F shown at a section position along the A-A line shown in FIG. 7A.

FIG. 7B is a perspective view showing a state before the corrugated tube C is set on the lower cover 10, FIG. 7C is a view of the state of FIG. 7B shown at a section position along the A-A line shown in FIG. 7A, FIG. 7D is a perspective view showing a state where the corrugated tube C is inserted between the pair of elastic hold arms 20, 20 of the lower cover 10, FIG. 7E is a view of the state of FIG. 7D shown at a section position along the A-A line shown in FIG. 7A, FIG. 7F is a perspective view showing a state where setting of the corrugated tube C on the lower cover 10 is completed, and FIG. 7G is a view the state of FIG. 7F shown at a section position along the A-A line shown in FIG. 7A.

Here, in FIGS. 7B to 7G, to make the lower cover 10 easier to see, the connector housing 100 and the wire W to be led out from the connector housing 100 are not shown.

Firstly, an operator pushes an end of the corrugated tube C having stored therein the wire W led out from the connector housing 100 into between the pair of elastic hold arms 20, 20 (see FIGS. 7B, 7C, 7D and 7E).

In this operation, the outermost peripheral surface of the corrugated tube C is brought into contact with the apexes of the tube fixing projections 20b of the pair of elastic hold arms 20, 20 and is thereby moved toward the tube placement wall 14 while spreading the distance between the pair of elastic hold arms 20, 20.

That is, the corrugated tube C is guided toward the tube placement wall 14 by the pair of elastic hold arms 20, 20.

As the operator moves the corrugated tube C while pushing the end face of the corrugated tube C against the positioning wall 14c, the operator can move the corrugated tube C in a state where the corrugated tube C is positioned in the wire W lead-out direction.

The operator places the end of the corrugated tube C on the tube placement wall 14 to thereby complete the operation to set the corrugated tube C on the lower cover 10 (see FIGS. 7F and 7G).

By this operation, the corrugated tube engaging ridges 14b and arm side corrugated tube engaging ridges 20a are fitted into the bellows-shaped recesses of the corrugated tube C and are also held by the pair of elastic hold arms 20, 20, so that the corrugated tube C is stably held by the tube connecting part 13.

Next, a procedure for connecting together the lower cover 10 and upper cover 30 and the operations of the respective parts of the connector cover 1 are described with reference to FIGS. 8C to 8H and FIGS. 9B to 9H.

Figure 8A:
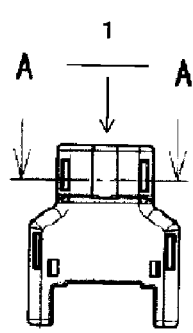
FIG. 8A is a top view of the upper cover.
Figure 8B:
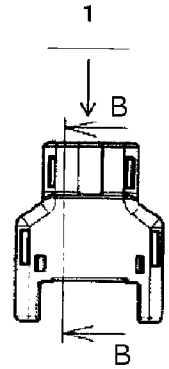
FIG. 8B is a top view of the upper cover.
Figures 8C, 8D, 8E:
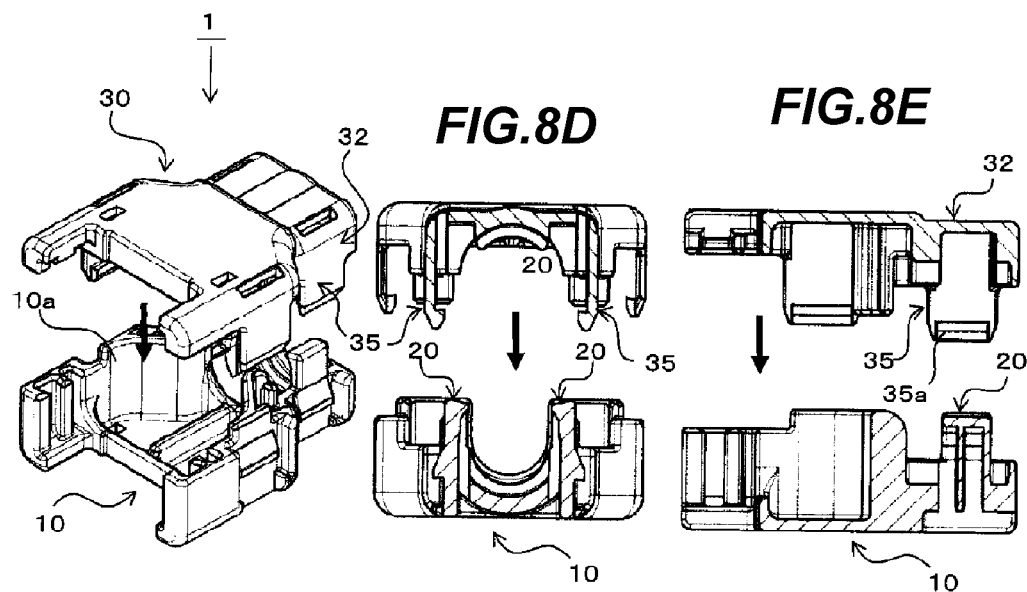
FIG. 8C is a perspective view showing a state the upper and lower covers face each other in their mutually locking direction.
FIG. 8D is a view of the state of FIG. 8C shown at a section position along the A-A line shown in FIG. 8A.
FIG. 8E is a view of the state of FIG. 8C shown at a section position along the B-B line shown in FIG. 8B.
Figures 8F, 8G, 8H:
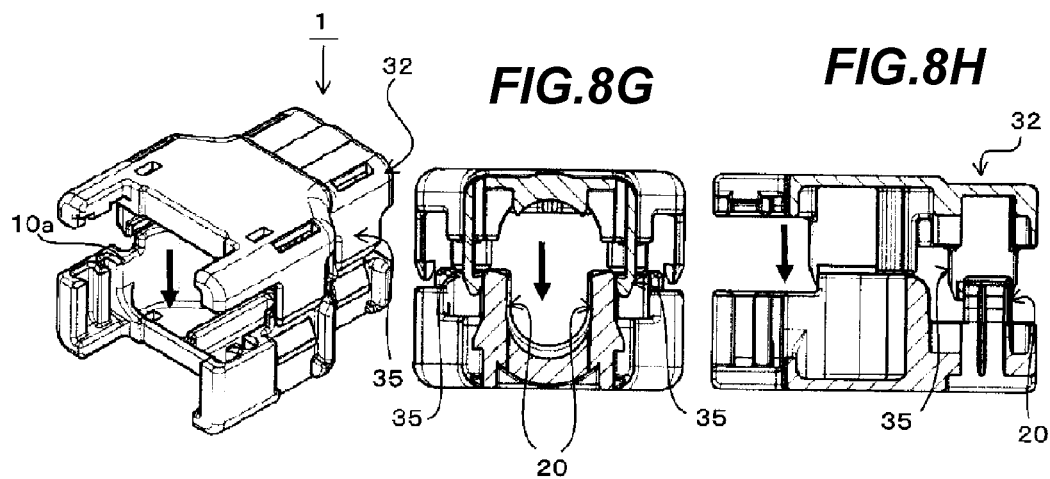
FIG. 8F is a perspective view showing a state where the movement of the upper cover in the direction to lock it to the lower cover is started.
FIG. 8G is a view of the state of FIG. 8F shown at a section position along the A-A line shown in FIG. 8A.
FIG. 8H is a view of the state of FIG. 8F shown at a section position along the B-B line shown in FIG. 8B.
Figure 9A:
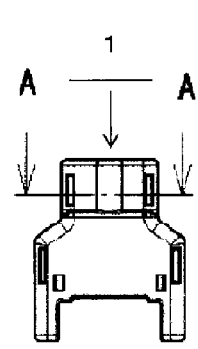
FIG. 9A is a top view of the upper cover.
Figure 9B:
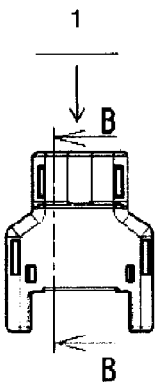
FIG. 9B is a top view of the upper cover.
Figure 9C:
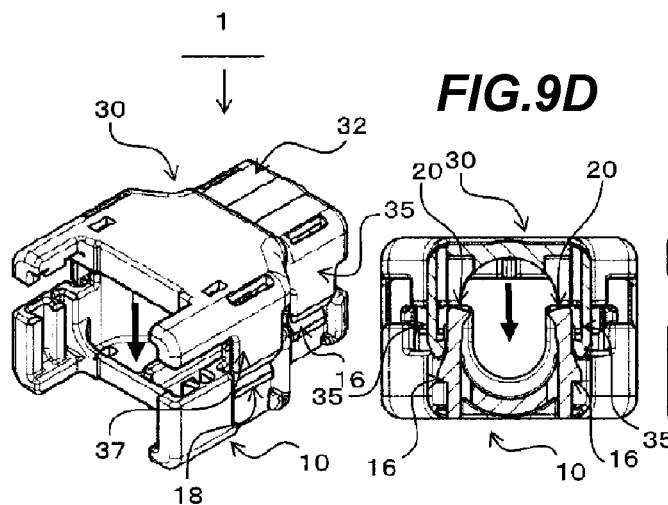
FIG. 9C is a perspective view showing a state where the upper cover is further moved in the direction to lock it to the lower cover from the state of FIG. 8F.
Figure 9D:
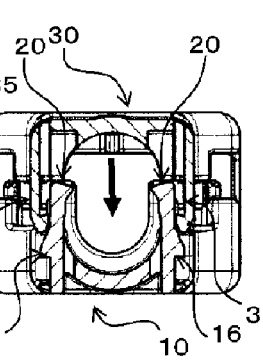
FIG. 9D is a view of the state of FIG. 9C shown at a section position along the A-A line shown in FIG. 9A.
Figure 9E:
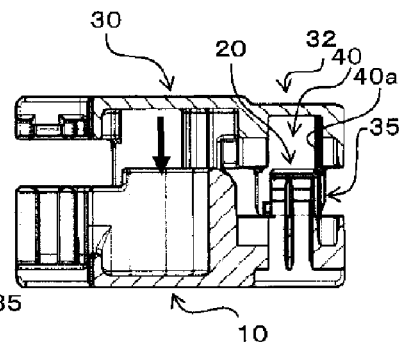
FIG. 9E is a view of the state of FIG. 9C shown at a section position along the B-B line shown in FIG. 9B.
Figure 9F:
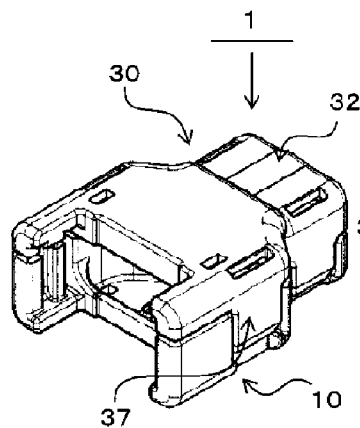
FIG. 9F is a perspective view showing a state where locking of the upper and lower covers is completed.
Figure 9G:
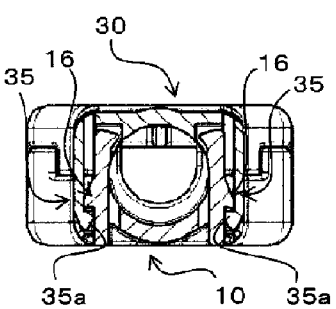
FIG. 9G is a view of the state of FIG. 9F shown at a section position along the A-A line shown in FIG. 9A.
Figure 9H:
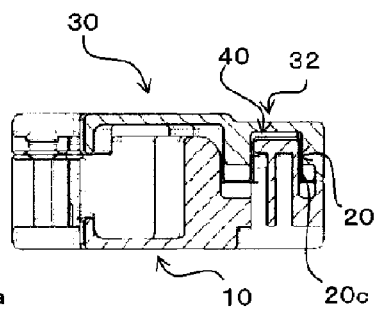
FIG. 9H is a view of the state of FIG. 9F shown at a section position along the B-B line shown in FIG. 9B.

FIG. 8C is a perspective view showing a state where the upper cover 30 and a lower cover 10 face each other in their mutually locking direction, FIG. 8D is a view of the state of FIG. 8C shown at a section position along the A-A line shown in FIG. 8A, FIG. 8E is a view of the state of FIG. 8C shown at a section position along the B-B line shown in FIG. 8B, FIG. 8F is a perspective view showing a state where the movement of the upper cover 30 in the locking direction with the lower cover 10 is started, FIG. 8G is a view of the state of FIG. 8F shown at a section position along the A-A line shown in FIG. 8A, and FIG. 8H is a view of the state of FIG. 8F at a section position along the B-B line shown in FIG. 8B. FIG. 9C is a perspective view showing a state where the upper cover 30 is further moved in the direction to lock it to the lower cover 10 from the state of FIG. 8F, FIG. 9D is a view of the state of FIG. 9C shown at a section position along the A-A line shown in FIG. 9A, FIG. 9E is a view of the state of FIG. 9C shown at a section position along the B-B line shown in FIG. 9B, FIG. 9F is a perspective view showing a state where locking of the upper cover 30 and lower cover 10 is completed, FIG. 9G is a view of the state of FIG. 9F shown at a section position along the A-A line shown in FIG. 9A, and FIG. 9H is a view of the state of FIG. 9F shown at a section position along the B-B line shown in FIG. 9B.

Here, in FIGS. 8C to 8H and FIGS. 9C to 9H, to make the lower cover 10 and upper cover 30 easier to see, the connector housing 100 and the corrugated tube C are not shown.

Firstly, the operator, in a state where the upper cover 30 and lower cover 10 face each other in their mutually locking direction, starts to move the upper cover 30 toward an opening 10a of the lower cover 10 (see FIGS. 8C, 8D and 8E).

In this operation, when the upper cover 30 approaches the opening 10a of the lower cover 10, the pair of elastic hold arms 20, 20 of the lower cover 10 are arranged between the pair of locking arm portions 35, 35 formed in the tube connecting part 32 of the upper cover 30 (see FIGS. 8F, 8G and 8H). Thus, when the upper cover 30 is moved in a state where it is displaced with respect to the lower cover 10 in the arrangement direction of the pair of elastic hold arms 20, 20, the locking projections 35a of the locking arm portions 35 are brought into contact with the elastic hold arms 20, so that the displacement between the upper cover 30 and lower cover 10 is corrected by the reaction forces of the locking arm portions 35.

The operator moves further the upper cover 30 toward a locking position with the lower cover 10 (see FIGS. 9C, 9D and 9E.)

In this operation, the locking projections 35a of the pair of locking arm portions 35, 35 formed in the tube connecting part 32 of the upper cover 30 move on to the locking projections 16 of the lower cover 10, whereby the pair of locking arm portions 35, 35 are elastically deflected in a manner to spread their clearance.

When the operator moves the upper cover 30 to the locking position with the lower cover 10, the upper cover 30 and lower cover 10 are connected and fixed together, thereby completing this operation (see FIGS. 9F, 9G and 9H.)

Due to this operation, the locking projections 35a of the pair of locking arm portions 35, 35 formed in the tube connecting part 32 of the upper cover 30 move over the locking projections 16 of the lower cover 10, whereby the upper cover 30 and lower cover 10 are locked to each other.

Thus, when the upper cover 30 and lower cover 10 are locked to each other, the tip ends of the pair of elastic hold arms 20, 20 are stored into the arm storing portions 40 of the upper cover 30.

Here, this operation completes assembling of the upper cover 30 and lower cover 10 such that the covers sandwich the wire W lead-out side end of the connector housing 100 and the end of the corrugated tube C.

In the connector cover 1 according to the embodiment 1, since the lower cover 10 and upper cover 30 are connected and fixed together with their respective locking portions 16, 18, 35, 37 locked to each other, the pair of elastic hold arms 20, 20 of the lower cover 10 hold the two side portions of the corrugated tube C and are also stored into the arm storing portions 40 of the upper cover 30.

Thus, in the connector cover 1 according to the embodiment 1, when a tensile force is applied to the corrugated tube C, the side surfaces 20c perpendicular to the wire W lead-out direction of the pair of elastic hold arms 20 are brought into contact with the facing surfaces 40a of the arm storing portions 40 which face the side surfaces 20c to thereby be able to disperse and absorb the tensile forces applied to the locking portions 16, 18, 35, 37. Therefore, even when a tensile force is applied to the corrugated tube C, the locking portions of the vertically divided cover can be prevented against damage.

Also, in the connector cover 1 according to the embodiment 1, the pair of elastic hold arms 20, 20 include on their inner surfaces the arm side corrugated tube engaging ridges 20a formed to be continuous with the corrugated tube engaging ridges 14b formed on the inner surface of the tube placement wall 14 so that the pair of elastic hold arms 20 can be fitted into the bellows-shaped recesses of the corrugated tube C.

Therefore, in the connector cover 1 according to the embodiment 1, the arm side corrugated tube engaging ridges 20a have a function to hold the corrugated tube C, have a function to enhance the rigidity of the pair of elastic hold arms 20 and a function to serve as the side faces 20c to be pushed against the arm storing portion 40.

[Embodiment 2]

Figure 10:
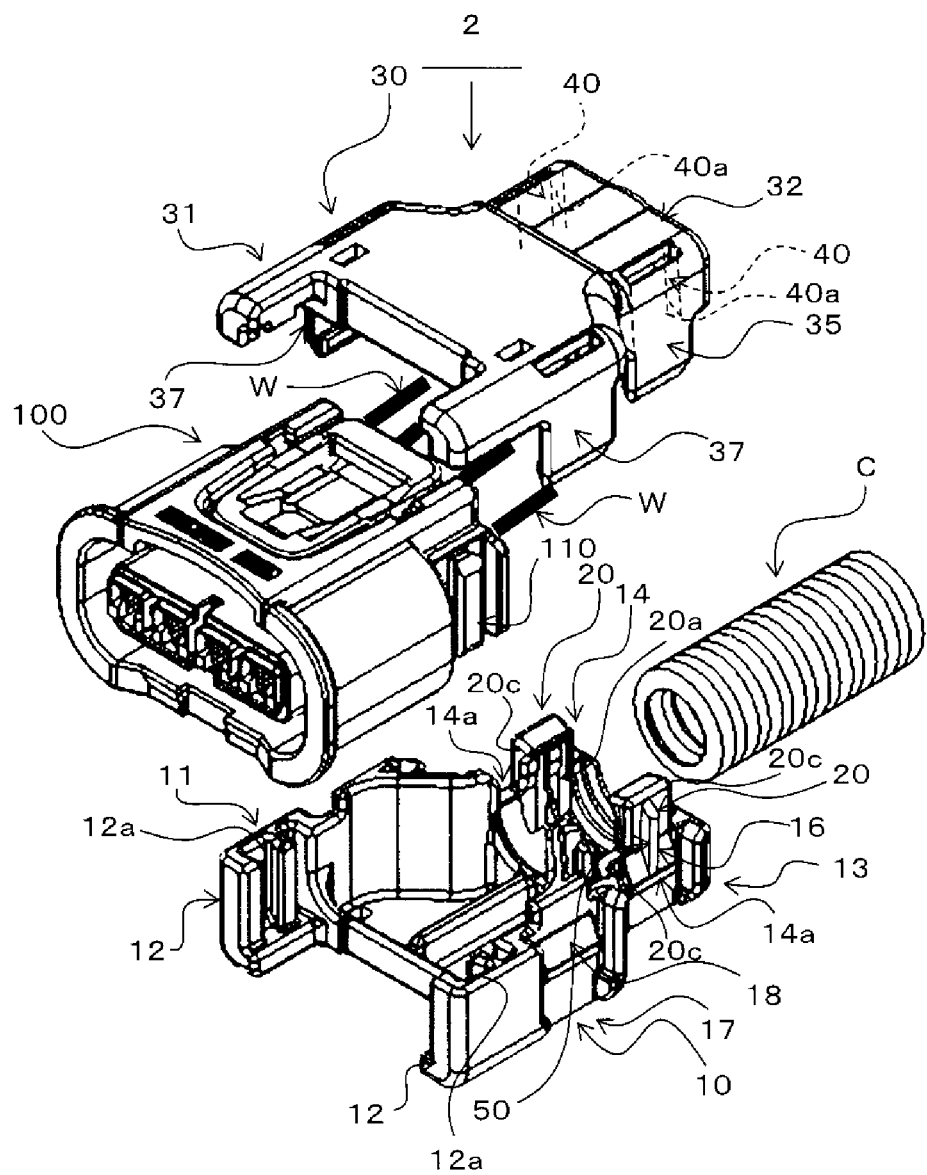
FIG. 10 is a view showing a state before upper and lower covers of a connector cover according to an embodiment 2 are assembled together so as to sandwich an end of a connector housing and an end of a corrugated tube.
Figure 11A:
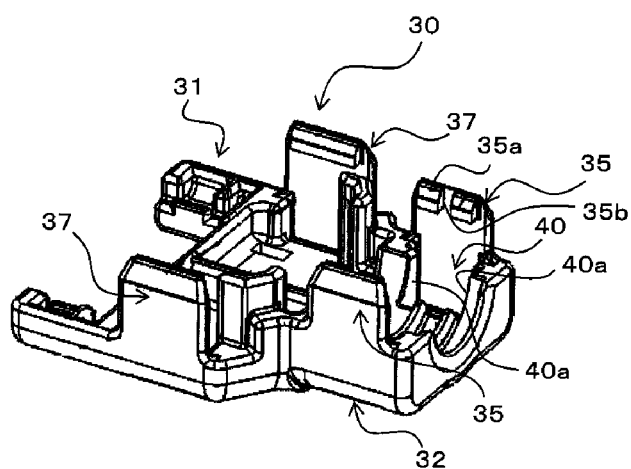
FIG. 11A is a perspective view of the upper cover.
Figure 11B:
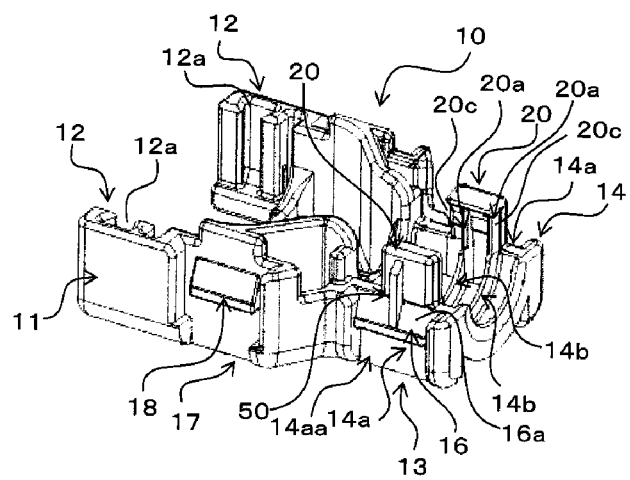
FIG. 11B is a perspective view of the lower cover.

Next, description is given of a connector cover 2 according to an embodiment with reference to FIGS. 10, 11A and 11B.

FIG. 10 is a view showing a state before an upper cover 30 and a lower cover 10 of the connector cover 2 according to the embodiment 2 are assembled together so as to sandwich an end of a connector housing 100 and an end of a corrugated tube C. FIG. 11A is a perspective view of the upper cover 30, and FIG. 11B is a perspective view of the lower cover 10.

The connector cover 2 according to the embodiment 2 is different from the connector cover 1 of the embodiment 1 in that it includes ribs 50 which respectively extend continuously from the outer surfaces of the two side walls 14a, 14a of the tube placement wall 14 of the lower cover 10 to the outer surfaces of the pair of elastic hold arms 20, 20.

The remaining configurations are similar to the embodiment 1. The same composing parts as the embodiment 1 are given the same designations and thus the description thereof is omitted.

The ribs 50 are respectively formed in linear shapes which extend continuously from the inclined surfaces 16a of the locking projections 16 provided on the outer surfaces of the pair of side walls 14a, 14a of the tube placement wall 14 to the outer surfaces of the respective elastic hold arms 20, 20.

Since the ribs 50 suppress the amounts of deflection deformation of the pair of elastic hold arms 20, 20, the engagement margin between the arm side corrugated tube engaging ridges 20a and corrugated tube C can be positively secured.

That is, the corrugated tube C is deflected and is inserted into between the pair of elastic hold arms 20, 20 and, due to restoration of the corrugated tube C, the arm side corrugated tube engaging ridges 20a are fitted into the bellows-shaped recesses.

The ribs 50 suppress forces to displace the pair of elastic hold arms 20, 20 and can positively deflect the corrugated tube C, thereby being able to suppress the mounting force of the corrugated tube C as much as possible.

Here, in connector cover 2 according to the embodiment 2, the locking projections 35a, 35a of the pair of locking arm portions 35, 35 of the upper cover 30 respectively include slits 35b through which the ribs 50 are allowed to pass.

The slits 35b have a function to prevent the respective locking projections 35a, 35a of the pair of locking arm portions 35, 35 from moving onto the ribs 50.

Next, a procedure for connecting and fixing together the lower cover 10 and upper cover 30 and the operations of the respective parts of the connector cover 2 are described with reference to FIGS. 12B to 12G.

Figure 12A:
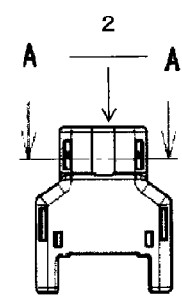
FIG. 12A is a top view of the upper cover.
Figure 12B:
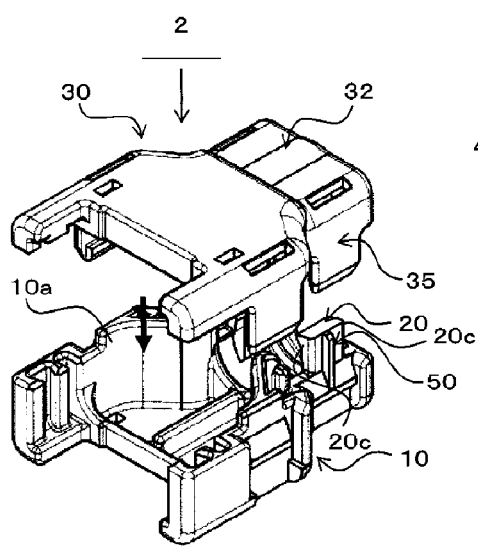
FIG. 12B is a perspective view showing a state where the upper and lower covers face each other in their mutually locking direction.
Figure 12C:
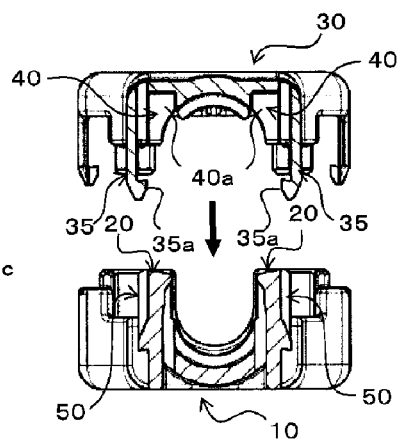
FIG. 12C is a view of the state of FIG. 12B shown at a section position along the A-A line shown in FIG. 12A.
Figure 12D:
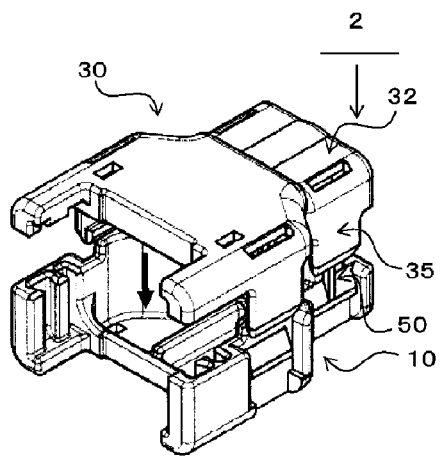
FIG. 12D is a perspective view showing a state where the movement of the upper cover in a direction to lock it to the lower cover is started.
Figure 12E:
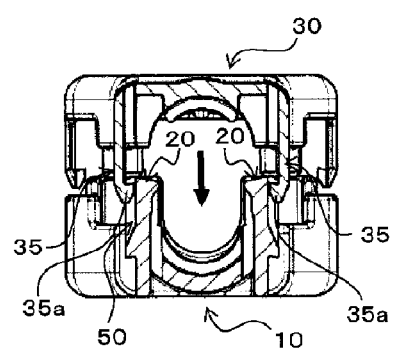
FIG. 12E is a view of the state of FIG. 12D shown at a section position along the A-A line shown in FIG. 12A.
Figure 12F:
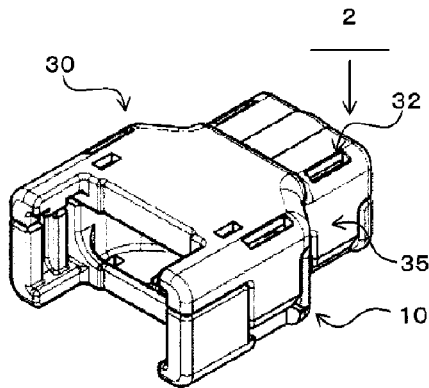
FIG. 12F is a view showing a state where locking between the upper and lower covers is completed.
Figure 12G:
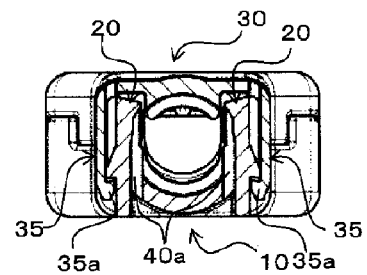
FIG. 12G is a view of the state of FIG. 12F shown at a section position along the A-A line shown in FIG. 12A.

FIG. 12B is a perspective view showing a state where the upper cover 30 and lower cover 10 face each other in their mutually locking direction, FIG. 12C is a view the state of FIG. 12B shown at a section position along the A-A line shown in FIG. 12A, FIG. 12D is a perspective view showing a state where the movement of the upper cover 30 in a direction to lock it to the lower cover 10 is started, FIG. 12E is a view of the state of FIG. 12D shown at a section position along the A-A line shown in FIG. 12A, FIG. 12F is a view showing a state where locking between the upper cover 30 and lower cover 10 is completed, and FIG. 12G is a view of the state of FIG. 12F shown at a section position along the A-A line shown in FIG. 12A.

Here, in FIGS. 12B to 12G, to make the lower cover 10 and upper cover 30 easier to see, the connector housing 100 and corrugated tube C are not shown.

Firstly, the operator arranges the upper cover 30 and lower cover 10 in a state where they face each other (see FIG. 12B and FIG. 12C), and starts to move the upper cover 30 toward the opening 10a of the lower cover 10 (see FIGS. 12D and 12E).

In this operation, when the upper cover 30 approaches the opening 10a of the lower cover 10, the pair of elastic hold arms 20, 20 of the lower cover 10 are arranged between the pair of locking arm portions 35, 35 formed in the tube connecting part 32 of the upper cover 30. Therefore, when the upper cover 30 is moved in a state where it is displaced in the arrangement direction of the pair of elastic hold arms 20, 20 with respect to the lower cover 10, the locking projections 35a of the locking arm portions 35 are brought into contact with the elastic hold arms 20 and, due to the reaction forces of the locking arm portions 35, the displacement between the upper cover 30 and lower cover 10 is corrected.

When the operator moves the upper cover 30 to a position where locking of the upper cover 30 with the lower cover 10 is completed, the lower cover 10 and upper cover 30 are connected and fixed together, so that the operator completes this operation (see FIGS. 12F and 12G.)

Due to this operation, the respective locking projections 35a of the pair of locking arm portions 35, 35 formed in the tube connecting part 32 of the upper cover 30 move over the respective locking projections 16 of the lower cover 10, whereby the upper cover 30 and lower cover 10 are locked to each other.

When the upper cover 30 and lower cover 10 are locked in this manner, the tip ends of the pair of elastic hold arms 20, 20 are stored into the respective storing portions 40 of the upper cover 30.

Here, since the deflection deformation amounts of the pair of elastic hold arms 20, 20 are suppressed by the ribs 50, the engagement margin between the arm side corrugated tube engaging ridges 20a and corrugated tube C can be positively secured.

In the connector cover 2 according to the embodiment 2, similarly to the connector cover 1 according to the embodiment 1, since the lower cover 10 and upper cover 30 are connected and fixed together with their respective locking portions 16, 18, 35, 37 locked to each other, the pair of elastic hold arms 20, 20 of the lower cover 10 hold the two side portions of the corrugated tube C and are also stored into the arm storing portions 40 of the upper cover 30.

Thus, in the connector cover 2 according to the embodiment 2, when a tensile force is applied to the corrugated tube C, the respective side surfaces 20c of the pair of elastic hold arms 20, 20 extending orthogonally to the wire W lead-out direction are pushed against facing surfaces 40a of the arm storing portions 40 which face the respective side surfaces 20c to thereby be able to disperse and absorb the tensile forces loaded to the respective locking portions 16, 18, 35, 37. Thus, even when the tensile forces are applied to the corrugated tube C, the locking portions of the vertically divided cover can be prevented against damage.

Also, in the connector cover 2 according to the embodiment 2, since there are provided the ribs 50 which respectively extend continuously from the outer surfaces of the two side walls 14a, 14a of the tube placement wall 14 to the outer surfaces of the pair of elastic hold arms 20, 20, the amounts of deflection deformation of the pair of elastic hold arms 20, 20 are suppressed, thereby making it possible to positively secure the engagement margin between the arm side corrugated tube engaging ridges 20a and corrugated tube C. [Embodiment 3]

Figure 13:
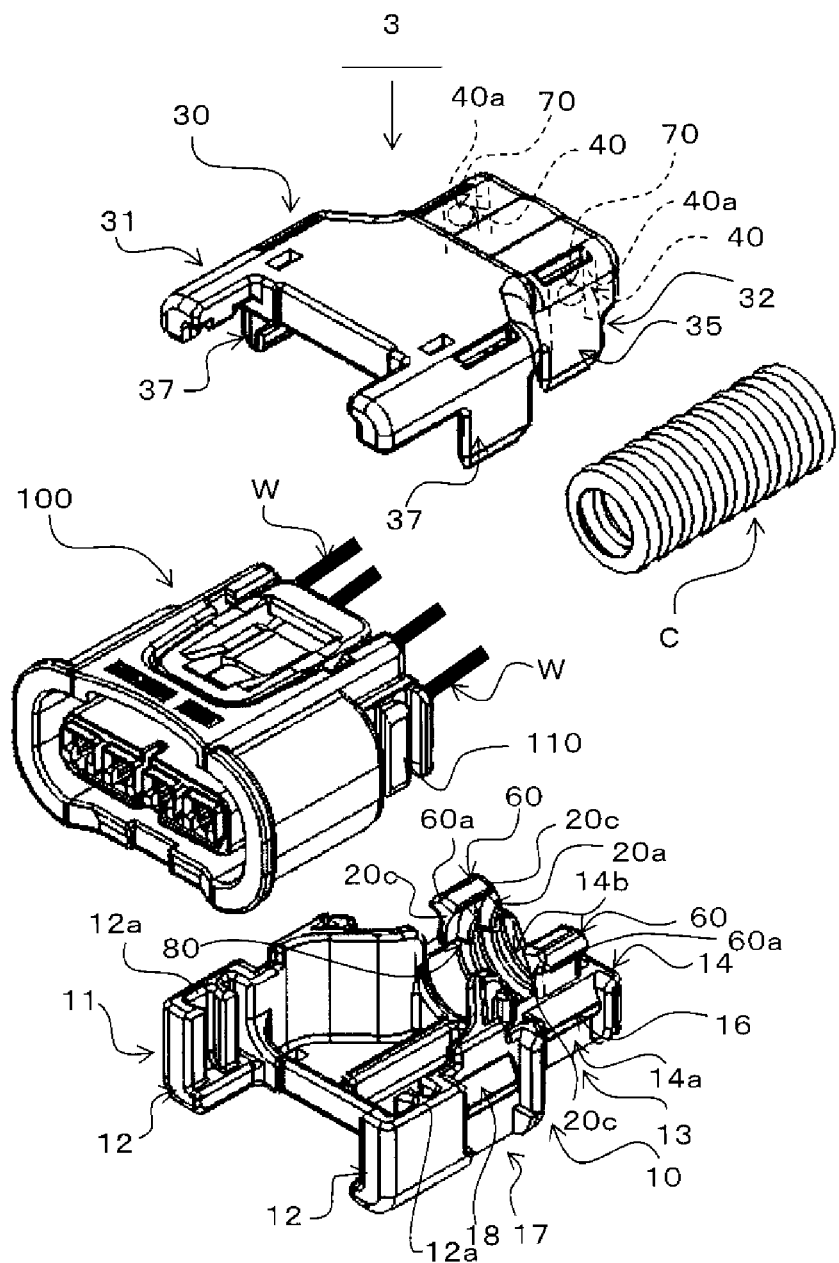
FIG. 13 is a view showing a state before upper and lower covers of a connector cover according to an embodiment 3 are assembled together so as to sandwich an end of a connector housing and an end of a corrugated tube.
Figure 14A:
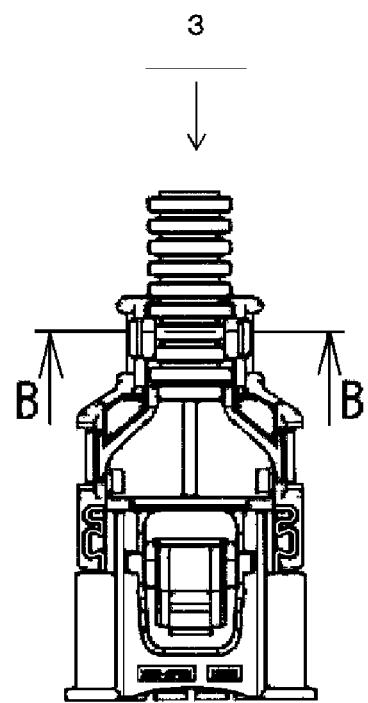
FIG. 14A is a top view showing a state where the upper and lower covers of the connector cover according to the embodiment 3 are assembled together so as to sandwich the end of the connector housing and the end of the corrugated tube; and, FIG. 14B is a section view of the lower cover and the corrugated tube set on the lower cover, taken along the B-B line shown in FIG. 14A.
Figure 14B:
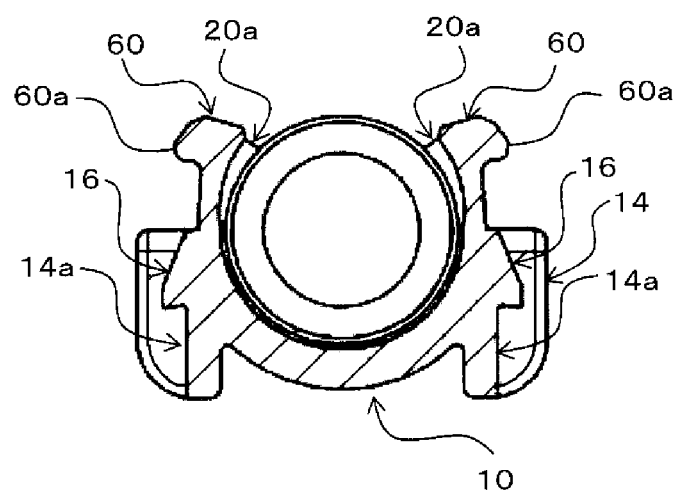
Figure 15:
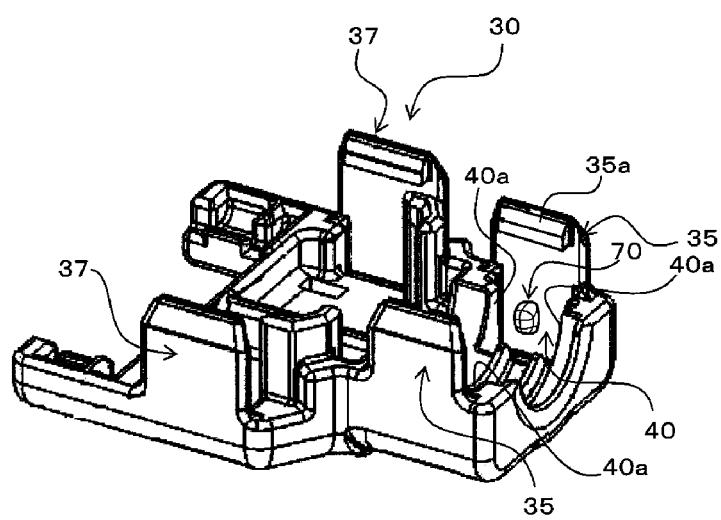
FIG. 15 is a perspective view of the upper cover.

Next, description is given of a connector cover 3 according to an embodiment 3 with reference to FIGS. 13 to 15.

FIG. 13 is a view showing a state before an upper cover 30 and a lower cover 10 of the connector cover 3 according to the embodiment 3 are assembled together so as to sandwich an end of the connector housing 100 and an end of a corrugated tube C. FIG. 14A is a top view showing a state where the upper cover 30 and lower cover 10 of the connector cover 3 according to the embodiment 3 are assembled together so as to sandwich the end of the connector housing 100 and the end of the corrugated tube C. FIG. 14B is a section view of the lower cover 10 and the corrugated tube C set on the lower cover 10, taken along the B-B line shown in FIG. 14A. FIG. 15 is a perspective view of the upper cover 30.

The connector cover 3 according to the embodiment 3 is different from the connector cover 1 according to the embodiment 1 in the following points: that is, a pair of elastic hold arms 60, 60 of the lower cover 10 are formed such that their clearance with respect to the outer peripheral surface of the corrugated tube C is increased when compared with the two side walls 14a, 14a of the tube placement wall 14; and, there are formed a pair of displacement protrusions 70, 70 which deflect the pair of elastic hold arms 60, 60 inward so as to reduce the clearance between the pair of elastic hold arms 60, 60 and the outer peripheral surface of the corrugated tube C.

Here, the remaining configurations are similar to the embodiment 1. The same composing parts as the embodiment 1 are given the same designations and thus the description thereof is omitted.

In the lower cover 10, as shown in FIGS. 14A and 14B, the pair of elastic hold arms 60, 60 are formed to have such a clearance with respect to the outer peripheral surface of the corrugated tube C as is increased when compared with the two side walls 14a, 14a of the tube placement wall 14.

The pair of elastic hold arms 60, 60 are formed in an arc shape so that, when they deflect inward, they can follow the outer peripheral surface of the corrugated tube C.

On the outer surface of the tip end of each of the pair of elastic hold arms 60, 60, there is provided a pressing protrusion 60a serving as a portion where the elastic hold arm 60 is pressed by the displacement protrusion 70 so as to deflect inward.

According to the lower cover 10, in the arm side corrugated tube engaging ridges 20a formed on the inner surfaces of the pair of elastic hold arms 60, 60, there are formed slits 80 which facilitate the inward deflection of the pair of elastic hold arms 60, 60 by the pair of displacement protrusions 70, 70.

In the upper cover 30, as shown in FIG. 15, the pair of displacement protrusions 70, 70 are provided on the inner surface of the arm storing portion 40.

Next, a procedure for setting the corrugated tube C on the lower cover 10 and the operations of the respective parts of the lower cover 10 are described with reference to FIGS. 16C to 16F.

Figure 16A:
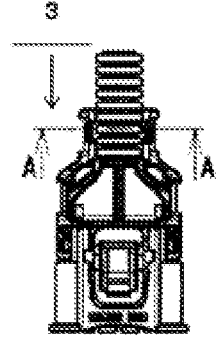
FIG. 16A is a top view of the upper cover.
Figure 16B:
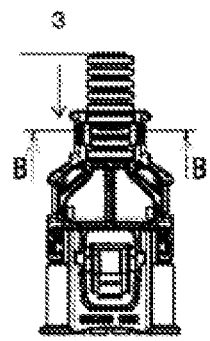
FIG. 16B is a top view of the upper cover.
Figure 16C:
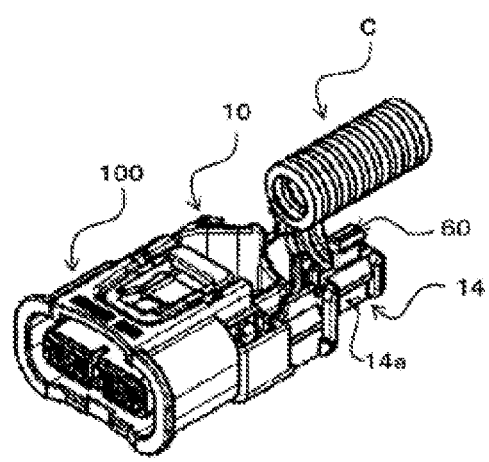
FIG. 16C is a perspective view of a corrugated tube in a state before it is set on the lower cover.
Figure 16D:
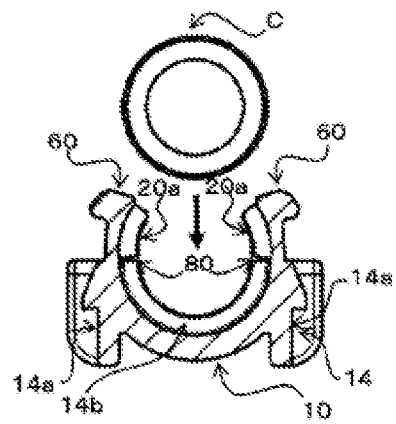
FIG. 16D is a view of the state of FIG. 16C shown at a section position along the A-A line shown in FIG. 16A.
Figure 16E:
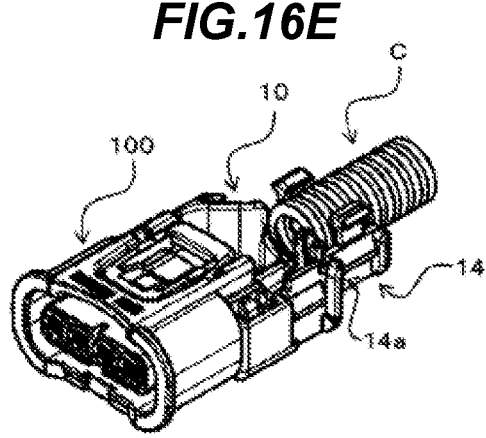
FIG. 16E is a perspective view showing a state where setting of a corrugated tube on the lower cover is completed.
Figure 16F:
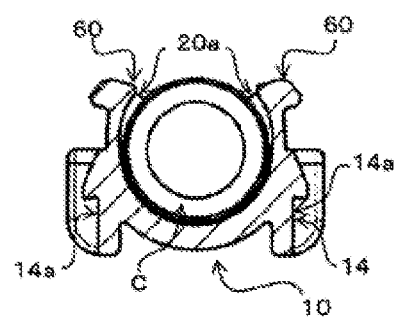
FIG. 16F is a view of the state of FIG. 16E shown at a section position along the B-B line shown in FIG. 16B.

FIG. 16C is a perspective view of the corrugated tube C in a state before it is set on the lower cover 10, FIG. 16D is a view of the state of FIG. 16C shown at a section position along the A-A line shown in FIG. 16A, FIG. 16E is a perspective view showing a state where setting of a corrugated tube C on the lower cover 10 is completed, and FIG. 16F is a view of the state of FIG. 16E shown at a section position along the B-B line shown in FIG. 16B.

In FIGS. 16C to 16F, to make the lower cover 10 easier to see, the wire W to be led out from the connector housing 100 is not shown.

Firstly, the operator pushes an end of the corrugated tube C storing therein the wire W led out from the connector housing 100 into between the pair of elastic hold arms 60, 60 (see FIGS. 16C and 16D.)

In this operation, the corrugated tube C is moved toward the tube placement wall 14 while spreading the clearance between the pair of elastic hold arms 60, 60.

Since the pair of elastic hold arms 60, 60 are provided such that their clearance with respect to the outer peripheral surface of the corrugated tube C placed on the tube placement wall 14 is increased when compared with the two side walls 14a, 14a of the tube placement wall 14, the corrugated tube C can be easily inserted between the pair of elastic hold arms 60, 60.

The operator places the end of the corrugated tube C on the tube placement wall 14 to thereby complete the operation to set the corrugated tube C on the lower cover 10 (see FIGS. 16E and 16F.)

Due to this operation, the corrugated tube engaging ridges 14b and the arm side corrugated tube engaging ridges 20a are fitted into the bellows-shaped recesses of the corrugated tube C and are also held by the pair of elastic hold arms 60, 60, so that the corrugated tube C can be stably held on the tube connecting part 32.

A procedure for connecting and fixing together the lower cover 10 and upper cover 30 and the operations of the respective parts of the connector cover 3 are described with reference to FIGS. 17A to 17F.

Figure 17A:
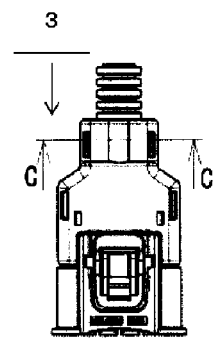
FIG. 17A is a top view of the upper cover.
Figure 17B:
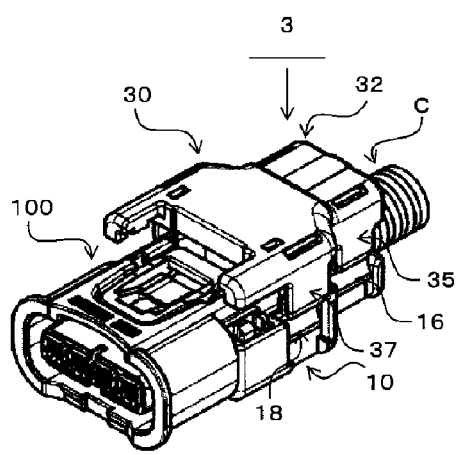
FIG. 17B is a perspective view showing a state where the movement of the upper cover in a direction to lock it to the lower cover is started.
Figure 17C:
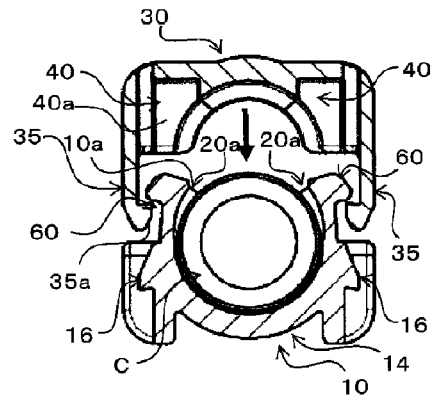
FIG. 17C is a view of the state of FIG. 17B shown at a section position along the C-C line shown in FIG. 17A.
Figure 17D:
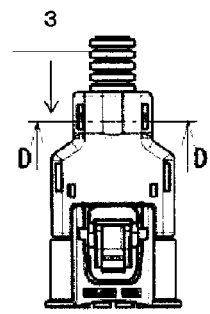
FIG. 17D is a top view of the upper cover.
Figure 17E:
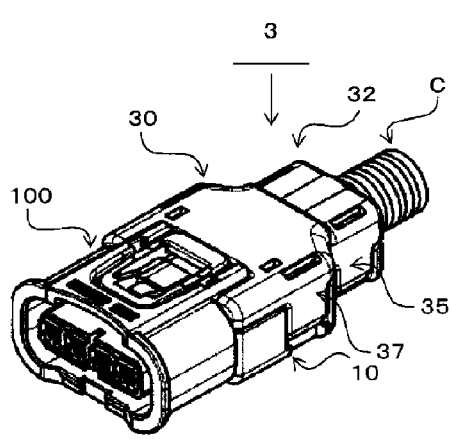
FIG. 17E is a perspective view showing a state where locking between the upper side and lower covers is completed.
Figure 17F:
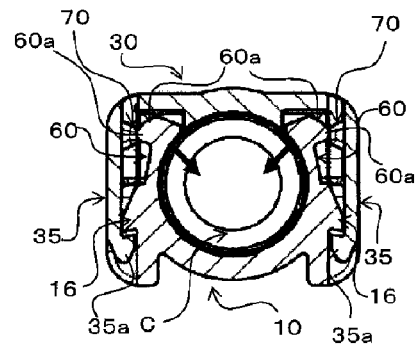
FIG. 17F is a view of the state of FIG. 17E shown at a section position along the D-D line shown in FIG. 17D.
Figure 18:
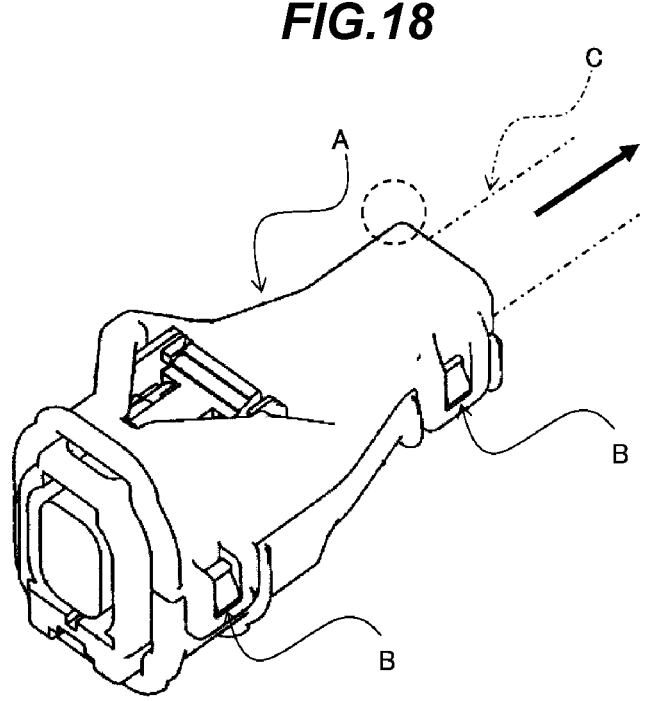
FIG. 18 is a view to explain problems found in the prior art.

FIG. 17B is a perspective view showing a state where the movement of the upper cover 30 in a direction to lock it to the lower cover 10 is started, FIG. 17C is a view of the state of FIG. 17B shown at a section position along the C-C line shown in FIG. 17A, FIG. 17E is a perspective view showing a state where locking between the upper cover 30 and lower cover 10 is completed, and FIG. 17F is a view of the state of FIG. 17E shown at a section position along the D-D line shown in FIG. 17D.

Firstly, the operator, from a state where the upper cover 30 and lower cover 10 face each other in their mutually locking direction, starts to move the upper cover 30 toward the opening 10a of the lower cover 10 (see FIGS. 17B and 17C.)

In this operation, as the upper cover 30 approaches the opening 10a of the lower cover 10, the pair of elastic hold arms 60, 60 of the lower cover 10 are arranged between the pair of locking arm portions 35, 35 formed in the tube connecting part 32 of the upper cover 30. Thus, when the upper cover 30 is moved in a state where it is displaced with respect to the lower cover 10 in the arrangement direction of the pair of elastic hold arms 60, 60, the locking projections 35a of the locking arm portions 35 are brought into contact with the elastic hold arms 60, whereby displacement between the upper cover 30 and lower cover 10 is corrected by the reaction forces of the locking arm portions 35.

When the operator has moved the upper cover 30 to a locking completion position with the lower cover 10, since the lower cover 10 and upper cover 30 are connected and fixed together, the operator completes this operation (see FIGS. 17E and 17F.)

Due to this operation, the locking projections 35a of the pair of locking arm portions 35, 35 provided on the tube connecting part 32 of the upper cover 30 move over the locking projections 16 of the lower cover 10, thereby locking the upper cover 30 and lower cover 10 to each other.

When the upper cover 30 and lower cover 10 are locked in this manner, the tip ends of the pair of elastic hold arms 60, 60 are stored into the arm storing portions 40 of the upper cover 30.

Since the pair of displacement protrusions 70, 70 of the upper cover 30 are pressed against the pair of elastic hold arms 60, 60, the pair of elastic hold arms 60, 60 deflect inward so as to narrow their clearance with respect to the outer peripheral surface of the corrugated tube C.

More specifically, since the pressing protrusions 60a provided on the tip ends of the pair of elastic hold arms 60, 60 are pressed by the pair of displacement protrusions 70, 70 which have been moved to and arranged at positions where they are contacted with each other, the pair of elastic hold arms 60, 60 follow the outer peripheral surface of the corrugated tube C and deflect inward so as to narrow its clearance with respect to the outer peripheral surface of the corrugated tube C.

Such inward deflection of the pair of elastic hold arms 60, 60 increases the engagement margin between the arm side corrugated tube engaging ridges 20a formed on the inner surfaces of the pair of elastic hold arms 60, 60 and corrugated tube C, so that the corrugated tube C can be held positively on the connector cover 3.

Since the slits 80 are formed in the arm side corrugated tube engaging ridges 20a, the pair of elastic hold arms 60, 60 can be easily deflected inward by the pair of displacement protrusions 70, 70.

In the connector cover 3 according to the embodiment 3, similarly to the connector cover 1 of the embodiment 1, the lower cover 10 and upper cover 30 are connected and fixed to each other through mutual locking of their locking portions 16, 18, 35, 37, whereby the pair of elastic hold arms 60, 60 of the lower cover 10 hold the two side portions of the corrugated tube C and are also stored into the arm storing portions 40 of the upper cover 30.

Thus, in the connector cover 3 according to the embodiment 3, when a tensile force is applied to the corrugated tube C, the respective side surfaces 20c of the pair of elastic hold arms 60, 60 extending orthogonally to the wire W lead-out direction are pushed against facing surfaces 40a of the arm storing portions 40 which face the respective side surfaces 20c to thereby be able to disperse and absorb the tensile forces applied to the respective locking portions 16, 18, 35, 37. Accordingly, even when the tensile forces are applied to the corrugated tube C, the locking portions of the vertically divided cover can be prevented against damage.

In the connector cover 3 of the embodiment 3, the pair of elastic hold arms 60, 60 are formed to have such a clearance with respect to the outer peripheral surface of the corrugated tube C set in the tube placement wall 14 as is increased when compared with the two side walls 14a, 14a of the tube placement wall 14, the corrugated tube C can be easily inserted between the pair of elastic hold arms 60, 60.

In the connector cover 3 of the embodiment 3, in a state where the upper cover 30 and lower cover 10 are connected and fixed to each other, the pair of displacement protrusions 70, 70 provided on the inner surfaces of the arm storing portions 40 of the upper cover 30 are pressed against the pair of elastic hold arms 60, 60, whereby the pair of elastic hold arms can be deflected inward so as to narrow their clearance with respect to the outer peripheral surface of the corrugated tube C.

Thus, the connector cover 3 of the embodiment 3 can increase the engagement margin between the arm side corrugated tube engaging ridges 20a provided on the respective inner surfaces of the pair of elastic hold arms 60, 60 and the corrugated tube C, whereby the corrugated tube C can be held positively by the connector cover 3.

In the connector cover 3 of the embodiment 3, since the slits 80 are formed in the arm side corrugated tube engaging ridges 20a, the pair of elastic hold arms 60, 60 can be easily deflected inward by the pair of displacement protrusions 70, 70.

Although the invention made by the present inventors has been specifically described based on the above embodiments of the invention, the invention is not limited to the above embodiments but various modifications can be made without departing from the subject matter thereof.

In accordance with the exemplary embodiments, a connector cover includes a lower cover and an upper cover. The lower cover and the upper cover are to be connected to each other so as to sandwich an end of a connector housing from which a wire is led out and an end of a corrugated tube that stores the wire led out from the connector housing between the lower cover and the upper cover. The lower cover includes a tube placement wall which has an arc-shaped inner surface and on which the corrugated tube is placed. The lower cover also includes a pair of elastic hold arms projected upward from both side walls of the tube placement wall and configured to elastically hold both side portions of the corrugated tube. The upper cover includes a pair of arm storing portions respectively configured to store the pair of elastic hold arms therein. The pair of arm storing portions respectively have facing surfaces. The facing surfaces respectively face side surfaces of the pair of hold arms perpendicular to the wire lead-out direction, in a state where a locking part of the lower cover and a locking part of the upper cover are locked to each other and the lower cover and the upper cover are connected to each other.

In the connector cover of the exemplary embodiments, each of the pair of hold arms may includes an arm side corrugated tube engaging ridge on an inner surface of the each of the pair of hold arms. The tube placement wall may include a tube placement wall side corrugated tube engaging ridge on an inner surface of the tube placement wall. The arm side corrugated tube engaging ridge may continuous with the tube placement wall side corrugated tube engaging ridge so as to be engaged into a bellows-shaped recess of the corrugated tube.

In the connector cover of the exemplary embodiments, ribs may respectively extends continuously from outer surfaces of the two side walls of the tube placement wall to outer surfaces of the pair of elastic hold arms.

In the connector cover of the exemplary embodiments, a clearance between each of the pair of elastic hold arms and an outer peripheral surface of the corrugated tube placed on the tube placement wall may be larger than a clearance between each of the two side walls of the tube placement wall and the outer peripheral surface of the corrugated tube placed on the tube placement wall. The upper cover may include a pair of displacement protrusions on an inner surfaces of the arm storing portions. The pair of displacement protrusions may respectively press the pair of elastic hold arms to thereby cause the pair of elastic hold arms to deflect inward so as to narrow the clearance between the each of the pair of elastic hold arms and the outer peripheral surface of the corrugated tube, when the upper cover is connected to the lower cover.

In the connector cover of the exemplary embodiments, the arm side corrugated tube engaging ridges may respectively include slits capable of facilitating the inward deflection of the pair of elastic hold arms by the pair of displacement protrusions.

According to the connector cover of the exemplary embodiments, as the lower cover and upper cover are connected and fixed to each other with their respective locking parts locked to each other, the pair of elastic hold arms of the lower cover hold both side portions of the corrugated tube and are also stored into the arm storing portions of the upper cover.

Accordingly, in the connector cover of the exemplary embodiments, when a tensile force is applied to the corrugated tube, the respective such side surfaces of the pair of elastic hold arms extending orthogonally to the wire lead-out direction are pushed against the facing surfaces of the arm storing portions which face the above respective facing surfaces, thereby being able to disperse and absorb the tensile forces loaded to the locking parts. Thus, even when a tensile force is applied to the corrugated tube, the locking parts of the vertically divided cover can be prevented against damage.

DESCRIPTION OF REFERENCE NUMERALS AND SIGNS 1, 2, 3: Connector cover
10: Lower cover
10a: Opening
11: Connector connecting part
12: Locking piece portion
12a: Locking groove
13: Tube connecting part
14: Tube placement wall
14a: Side wall
14aa: Recess
14b: Corrugated tube engaging ridge
14c: Positioning wall
15: Tube storage main body
16: Locking projection (Locking part)
16a: Inclined surface
17: Intermediate part
17a: Bottom wall
17b: Side wall
17bb: Recess
17c: Rib storage portion
18: Locking projection (Locking part)
20, 60: Elastic hold arm
20c: Side surface
20a: Arm side corrugated tube engaging ridge
20b: Tube fixing projection
30: Upper cover
31: Connector connecting part
31a: Piece portion
32: Tube connecting part
33: Tube covering wall
33a: Side wall
33b: Corrugated tube engaging ridge
34: Tube covering main body
35: Locking arm portion (Locking part)
35a: Locking projection
35b: Slit
36: Intermediate part
36a: Ceiling wall
37: Locking arm portion (Locking part)
37a: Locking projection
38: Backlash suppressing rib
40: Arm storing portion
40a: Surface
50: Rib
60a: Pressing protrusion
70: Displacement protrusion
80: Slit
100: Connector housing
110: Locking projection
C: Corrugated tube
W: Wire

What is claimed is:

1. A connector cover comprising:
   a lower cover; and
   an upper cover,
   wherein the lower cover and the upper cover are to be connected to each other so as to sandwich an end of a connector housing from which a wire is led out and an end of a corrugated tube that stores the wire led out from the connector housing between the lower cover and the upper cover,
   wherein the lower cover includes:
      a tube placement wall which has an arc-shaped inner surface and on which the corrugated tube is placed; and
      a pair of elastic hold arms projected upward from both side walls of the tube placement wall and configured to elastically hold both side portions of the corrugated tube,
   wherein the upper cover includes a pair of arm storing portions respectively configured to store the pair of elastic hold arms therein,
   wherein the pair of arm storing portions respectively have facing surfaces,
   wherein the facing surfaces respectively face side surfaces of the pair of hold arms perpendicular to a wire lead-out direction, in a state where a locking part of the lower cover and a locking part of the upper cover are locked to each other and the lower cover and the upper cover are connected to each other, and wherein ribs are respectively extending continuously from outer surfaces of the two side walls of the tube placement wall to outer surfaces of the pair of elastic hold arms.

2. The connector cover according to claim 1, wherein each of the pair of hold arms includes an arm side corrugated tube engaging ridge on an inner surface of each of the pair of hold arms,
wherein the tube placement wall includes a tube placement wall side corrugated tube engaging ridge on an inner surface of the tube placement wall,
wherein the arm side corrugated tube engaging ridge is continuous with the tube placement wall side corrugated tube engaging ridge so as to be engaged into a bellows-shaped recess of the corrugated tube.

3. A connector cover comprising:
a lower cover; and
an upper cover,
wherein the lower cover and the upper cover are to be connected to each other so as to sandwich an end of a connector housing from which a wire is led out and an end of a corrugated tube that stores the wire led out from the connector housing between the lower cover and the upper cover,
wherein the lower cover includes:
a tube placement wall which has an arc-shaped inner surface and on which the corrugated tube is placed; and
a pair of elastic hold arms projected upward from both side walls of the tube placement wall and configured to elastically hold both side portions of the corrugated tube,
wherein the upper cover includes a pair of arm storing portions respectively configured to store the pair of elastic hold arms therein,
wherein the pair of arm storing portions respectively have facing surfaces,
wherein the facing surfaces respectively face side surfaces of the pair of hold arms perpendicular to a wire lead-out direction, in a state where a locking part of the lower cover and a locking part of the upper cover are locked to each other and the lower cover and the upper cover are connected to each other,
wherein each of the pair of hold arms includes an arm side corrugated tube engaging ridge on an inner surface of each of the pair of hold arms,
wherein the tube placement wall includes a tube placement wall side corrugated tube engaging ridge on an inner surface of the tube placement wall,
wherein the arm side corrugated tube engaging ridge is continuous with the tube placement wall side corrugated tube engaging ridge so as to be engaged into a bellows-shaped recess of the corrugated tube,
wherein a clearance between each of the pair of elastic hold arms and an outer peripheral surface of the corrugated tube placed on the tube placement wall is larger than a clearance between each of the two side walls of the tube placement wall and the outer peripheral surface of the corrugated tube placed on the tube placement wall,
wherein the upper cover includes a pair of displacement protrusions on an inner surfaces of the arm storing portions,
wherein the pair of displacement protrusions are configured to respectively press the pair of elastic hold arms to thereby cause the pair of elastic hold arms to deflect inward so as to narrow the clearance between the each of the pair of elastic hold arms and the outer peripheral surface of the corrugated tube, in a state where the upper cover is connected to the lower cover.

4. The connector cover according to claim 3, wherein the arm side corrugated tube engaging ridges respectively include slits capable of facilitating the inward deflection of the pair of elastic hold arms by the pair of displacement protrusions.

5. A connector cover comprising:
a lower cover; and
an upper cover,
wherein the lower cover and the upper cover are to be connected to each other so as to sandwich an end of a connector housing from which a wire is led out and an end of a corrugated tube that stores the wire led out from the connector housing between the lower cover and the upper cover,
wherein the lower cover includes:
a tube placement wall which has an arc-shaped inner surface and on which the corrugated tube is placed; and
a pair of elastic hold arms projected upward from both side walls of the tube placement wall and configured to elastically hold both side portions of the corrugated tube,
wherein the upper cover includes a pair of arm storing portions respectively configured to store the pair of elastic hold arms therein,
wherein the pair of arm storing portions respectively have facing surfaces, and
wherein the facing surfaces respectively face side surfaces of the pair of hold arms perpendicular to a wire lead-out direction, in a state where a locking part of the lower cover and a locking part of the upper cover are locked to each other and the lower cover and the upper cover are connected to each other,
wherein each of the pair of hold arms includes an arm side corrugated tube engaging ridge on an inner surface of each of the pair of hold arms,
wherein the tube placement wall includes a tube placement wall side corrugated tube engaging ridge on an inner surface of the tube placement wall,
wherein the arm side corrugated tube engaging ridge is continuous with the tube placement wall side corrugated tube engaging ridge so as to be engaged into a bellows-shaped recess of the corrugated tube,
wherein each of the hold arms includes a free end that is spaced away from the tube placement wall, and
the arm side corrugated tube engaging ridge extends from the tube placement wall side corrugated tube engaging ridge to the free end of the respective one of the hold arms.

6. A connector cover comprising:
a lower cover; and
an upper cover,
wherein the lower cover and the upper cover are to be connected to each other so as to sandwich an end of a connector housing from which a wire is led out and an end of a corrugated tube that stores the wire led out from the connector housing between the lower cover and the upper cover,
wherein the lower cover includes:
a tube placement wall which has an arc-shaped inner surface and on which the corrugated tube is placed; and a pair of elastic hold arms projected upward from both side walls of the tube placement wall and configured to elastically hold both side portions of the corrugated tube, wherein the upper cover includes a pair of arm storing portions respectively configured to store the pair of elastic hold arms therein, wherein the pair of arm storing portions respectively have facing surfaces, wherein the facing surfaces respectively face side surfaces of the pair of hold arms perpendicular to a wire lead-out direction, in a state where a locking part of the lower cover and a locking part of the upper cover are locked to each other and the lower cover and the upper cover are connected to each other, wherein each of the hold arms includes a free end that is spaced away from the tube placement wall, and the free ends are spaced away from each other by a distance that is less than an outermost diameter of the corrugated tube.

7. The connector cover according to claim 1, wherein the arm storing portions are recessed portions that are formed on inner surfaces of the upper cover.

* * * * *